United States Patent
Taylor et al.

(10) Patent No.: US 10,218,938 B2
(45) Date of Patent: *Feb. 26, 2019

(54) METHODS AND SYSTEMS FOR MULTI-PANE VIDEO COMMUNICATIONS WITH PHOTO-BASED SIGNATURE VERIFICATION

(71) Applicant: ALEXANDER MACKENZIE & PRANGER, Sandy, UT (US)

(72) Inventors: Jed W Taylor, South Jordan, UT (US); Timothy Eugene Pranger, Eagle Mountain, UT (US); Benjamin K. Breeze, Salt Lake City, UT (US)

(73) Assignee: POPIO IP HOLDINGS, LLC, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,040

(22) Filed: Oct. 24, 2017

(65) Prior Publication Data

US 2018/0048864 A1      Feb. 15, 2018

Related U.S. Application Data

(63) Continuation-in-part of application No. 15/498,290, filed on Apr. 26, 2017, which is a continuation of
(Continued)

(51) Int. Cl.
*G06F 3/14* (2006.01)
*H04N 7/14* (2006.01)
(Continued)

(52) U.S. Cl.
CPC ........... *H04N 7/147* (2013.01); *G06F 3/0488* (2013.01); *G06F 3/04842* (2013.01);
(Continued)

(58) Field of Classification Search
CPC combination set(s) only.
See application file for complete search history.

(56) References Cited

U.S. PATENT DOCUMENTS

D619,593 S    7/2010  Fujioka et al.
7,812,988 B2 * 10/2010  Doo ...................... G06T 11/60
                                                                     348/14.01
(Continued)

FOREIGN PATENT DOCUMENTS

EP              2833595 A1    2/2015
WO       WO 2017/180226       10/2017

OTHER PUBLICATIONS

International Search Report & Written Opinion as received in PCTUS2017-016584 dated Apr. 25, 2017.
(Continued)

*Primary Examiner* — Phung-Hoang J Nguyen
(74) *Attorney, Agent, or Firm* — Keller Jolley Preece

(57) ABSTRACT

Systems and methods are disclosed for establishing a video connection between a mobile device and a support terminal while enabling the support terminal to concurrently push display elements to the mobile device through a separate connection. In particular, in one or more embodiments, the disclosed systems and methods establish a first connection between the support terminal and the mobile device and conduct a video chat between the devices transmitted through the first connection. The disclosed systems and methods enable the support terminal to push a display element to the mobile device through a second connection. In response to receiving the display element, the disclosed systems and methods divide the display screen of the mobile device into at least a first pane and a second pane, providing the video chat for display on the first pane and the display element for display on the second pane.

20 Claims, 17 Drawing Sheets

Related U.S. Application Data application No. 15/208,576, filed on Jul. 12, 2016, now Pat. No. 9,699,406, which is a continuation-in-part of application No. 29/561,280, filed on Apr. 14, 2016.

(51) Int. Cl.

| | |
|---|---|
| *H04N 7/15* | (2006.01) |
| *G06Q 20/04* | (2012.01) |
| *G06Q 20/32* | (2012.01) |
| *G06Q 40/02* | (2012.01) |
| *H04L 29/06* | (2006.01) |
| *H04N 21/00* | (2011.01) |
| *H04N 5/232* | (2006.01) |
| *H04N 7/085* | (2006.01) |
| *G06F 3/0484* | (2013.01) |
| *G06F 3/0488* | (2013.01) |

(52) U.S. Cl.
CPC .......... *G06F 3/1446* (2013.01); *G06Q 20/042* (2013.01); *G06Q 20/3223* (2013.01); *G06Q 40/02* (2013.01); *H04L 65/1069* (2013.01); *H04N 5/232* (2013.01); *H04N 5/23254* (2013.01); *H04N 5/23293* (2013.01); *H04N 7/085* (2013.01); *H04N 7/14* (2013.01); *H04N 7/15* (2013.01); *H04N 21/00* (2013.01); *G06F 2203/04803* (2013.01)

(56) References Cited

U.S. PATENT DOCUMENTS

| | | | |
|---|---|---|---|
| 8,117,562 B2 | 2/2012 | Getsch | |
| D670,716 S | 11/2012 | Majeed et al. | |
| D700,912 S | 3/2014 | Kim | |
| 8,782,043 B2 | 7/2014 | Chisholm et al. | |
| 8,890,685 B1 | 11/2014 | Sookman et al. | |
| 8,924,465 B1 | 12/2014 | Tunguz-Zawislak | |
| 8,955,743 B1 | 2/2015 | Block et al. | |
| D725,133 S | 3/2015 | Smirin et al. | |
| D725,665 S | 3/2015 | Tseng et al. | |
| D726,736 S | 4/2015 | Smirin et al. | |
| D739,867 S | 9/2015 | Faria et al. | |
| D747,733 S | 1/2016 | Scalisi | |
| 9,245,100 B2 | 1/2016 | Marco et al. | |
| D755,812 S | 5/2016 | Lim | |
| D759,662 S | 6/2016 | Panjabi | |
| D760,259 S | 6/2016 | Watson | |
| D762,231 S | 7/2016 | Pearson | |
| D762,676 S | 8/2016 | Lim | |
| D762,686 S | 8/2016 | Lee et al. | |
| D763,872 S | 8/2016 | Tussy | |
| D765,683 S | 9/2016 | Peng | |
| D767,601 S | 9/2016 | Zhou | |
| D768,148 S | 10/2016 | Jung et al. | |
| D769,921 S | 10/2016 | Smith | |
| D770,487 S | 11/2016 | Li | |
| D770,488 S | 11/2016 | Li | |
| D774,061 S | 12/2016 | Wu | |
| D776,147 S | 1/2017 | Simmons et al. | |
| D777,733 S | 1/2017 | Loosli et al. | |
| D779,540 S | 2/2017 | Rad et al. | |
| D780,787 S | 3/2017 | Gomez | |
| D781,311 S | 3/2017 | Rad et al. | |
| D781,874 S | 3/2017 | Dunn | |
| D789,389 S | 6/2017 | Kim et al. | |
| D789,395 S | 6/2017 | Weeresinghe | |
| D789,956 S | 6/2017 | Ortega et al. | |
| D790,578 S | 6/2017 | Hatzikostas | |
| 9,699,406 B1 | 7/2017 | Pranger et al. | |
| D793,427 S | 8/2017 | Sun | |
| D797,118 S | 9/2017 | Van Every et al. | |
| D803,851 S | 11/2017 | Vazquez | |
| 9,820,085 B1 | 11/2017 | Telang et al. | |
| 2005/0149630 A1 | 7/2005 | Smolinski et al. | |
| 2006/0114315 A1 | 6/2006 | Crook | |
| 2006/0152594 A1 | 7/2006 | Landschaft et al. | |
| 2007/0067267 A1 | 3/2007 | Ives | |
| 2007/0093241 A1 | 4/2007 | Oh et al. | |
| 2008/0075067 A1 | 3/2008 | Guglielmi et al. | |
| 2009/0313167 A1 | 12/2009 | Dujari et al. | |
| 2010/0053302 A1 | 3/2010 | Ivashin et al. | |
| 2012/0017149 A1 | 1/2012 | Lai et al. | |
| 2012/0030741 A1* | 2/2012 | Chai ................... H04L 41/0806 726/6 |
| 2012/0251985 A1 | 10/2012 | Steels et al. | |
| 2012/0296747 A1* | 11/2012 | Triola ................. G06Q 20/10 705/14.66 |
| 2013/0083066 A1 | 4/2013 | Aoki et al. | |
| 2013/0203345 A1 | 8/2013 | Fisher | |
| 2014/0022328 A1 | 1/2014 | Gechter et al. | |
| 2014/0051402 A1 | 2/2014 | Qureshi | |
| 2014/0063174 A1 | 3/2014 | Junuzovic et al. | |
| 2014/0106721 A1 | 4/2014 | Calman et al. | |
| 2014/0214967 A1 | 7/2014 | Baba et al. | |
| 2015/0149536 A1* | 5/2015 | Nishikawa ............ H04L 67/34 709/203 |
| 2015/0149565 A1 | 5/2015 | Ahmed | |
| 2015/0227298 A1 | 8/2015 | Kim et al. | |
| 2015/0234636 A1* | 8/2015 | Barnes, Jr. ............ G06F 3/167 715/728 |
| 2015/0256695 A1 | 9/2015 | Showering et al. | |
| 2015/0304196 A1 | 10/2015 | Sun et al. | |
| 2015/0326729 A1 | 11/2015 | Paolini-Subramanya | |
| 2015/0334344 A1 | 11/2015 | Shoemake | |
| 2015/0350446 A1 | 12/2015 | Glass et al. | |
| 2016/0006817 A1 | 1/2016 | Mitic et al. | |
| 2016/0100298 A1 | 4/2016 | Peterson | |
| 2016/0192308 A1 | 6/2016 | Turney et al. | |
| 2016/0212255 A1 | 7/2016 | Lee et al. | |
| 2016/0224210 A1 | 8/2016 | Moore et al. | |
| 2016/0300030 A1 | 10/2016 | Vann et al. | |
| 2016/0337424 A1 | 11/2016 | Mandyam | |
| 2016/0378744 A1 | 12/2016 | XiangLi et al. | |
| 2017/0017635 A1 | 1/2017 | Leliwa et al. | |
| 2017/0140504 A1 | 5/2017 | Jeong et al. | |
| 2017/0150223 A9 | 5/2017 | Zaccone et al. | |
| 2017/0171700 A1 | 6/2017 | Sabarez et al. | |
| 2017/0270079 A1 | 9/2017 | Rajwat et al. | |
| 2017/0302884 A1 | 10/2017 | Pranger et al. | |
| 2017/0313262 A1 | 11/2017 | Wisnia et al. | |
| 2017/0366353 A1 | 12/2017 | Struttmann | |
| 2017/0368413 A1 | 12/2017 | Shavit | |
| 2018/0012432 A1* | 1/2018 | Shin ................... G07C 9/00309 |
| 2018/0018396 A1 | 1/2018 | Roundtree et al. | |
| 2018/0018838 A1 | 1/2018 | Fankhauser et al. | |
| 2018/0035074 A1* | 2/2018 | Barnes, Jr. .......... H04N 5/772 |
| 2018/0048865 A1 | 2/2018 | Taylor et al. | |
| 2018/0054446 A1* | 2/2018 | Modras ................. G10L 15/265 |
| 2018/0103341 A1* | 4/2018 | Moiyallah, Jr. ...... H04W 4/021 |
| 2018/0104573 A1 | 4/2018 | Jeffery et al. | |
| 2018/0176272 A1 | 6/2018 | Zur et al. | |
| 2018/0367755 A1 | 12/2018 | Pranger et al. | |

OTHER PUBLICATIONS

U.S. Appl. No. 15/208,576, Nov. 30, 2016, Office Action.
U.S. Appl. No. 15/208,576, Feb. 16, 2017, Office Action.
U.S. Appl. No. 15/208,576, May 8, 2017, Office Action.
U.S. Appl. No. 15/208,576, May 24, 2017, Notice of Allowance.
U.S. Appl. No. 15/498,290, Oct. 19, 2017, Office Action.
U.S. Appl. No. 29/561,280, Jan. 24, 2018, Restriction Requirement.
U.S. Appl. No. 15/498,290, Mar. 21, 2018, Office Action.
U.S. Appl. No. 15/498,290, Jul. 18, 2018, Notice of Allowance.
U.S. Appl. No. 15/793,806, May 9, 2018, Office Action.
U.S. Appl. No. 29/561,180, filed Aug. 14, 2018, Office Action.
U.S. Appl. No. 15/498,290, filed Aug. 24, 2018, Notice of Allowance.

(56) References Cited

OTHER PUBLICATIONS

U.S. Appl. No. 15/793,806, filed Sep. 13, 2018, Office Action.
U.S. Appl. No. 15/793,806, filed Nov. 9, 2018, Notice of Allowance.

* cited by examiner

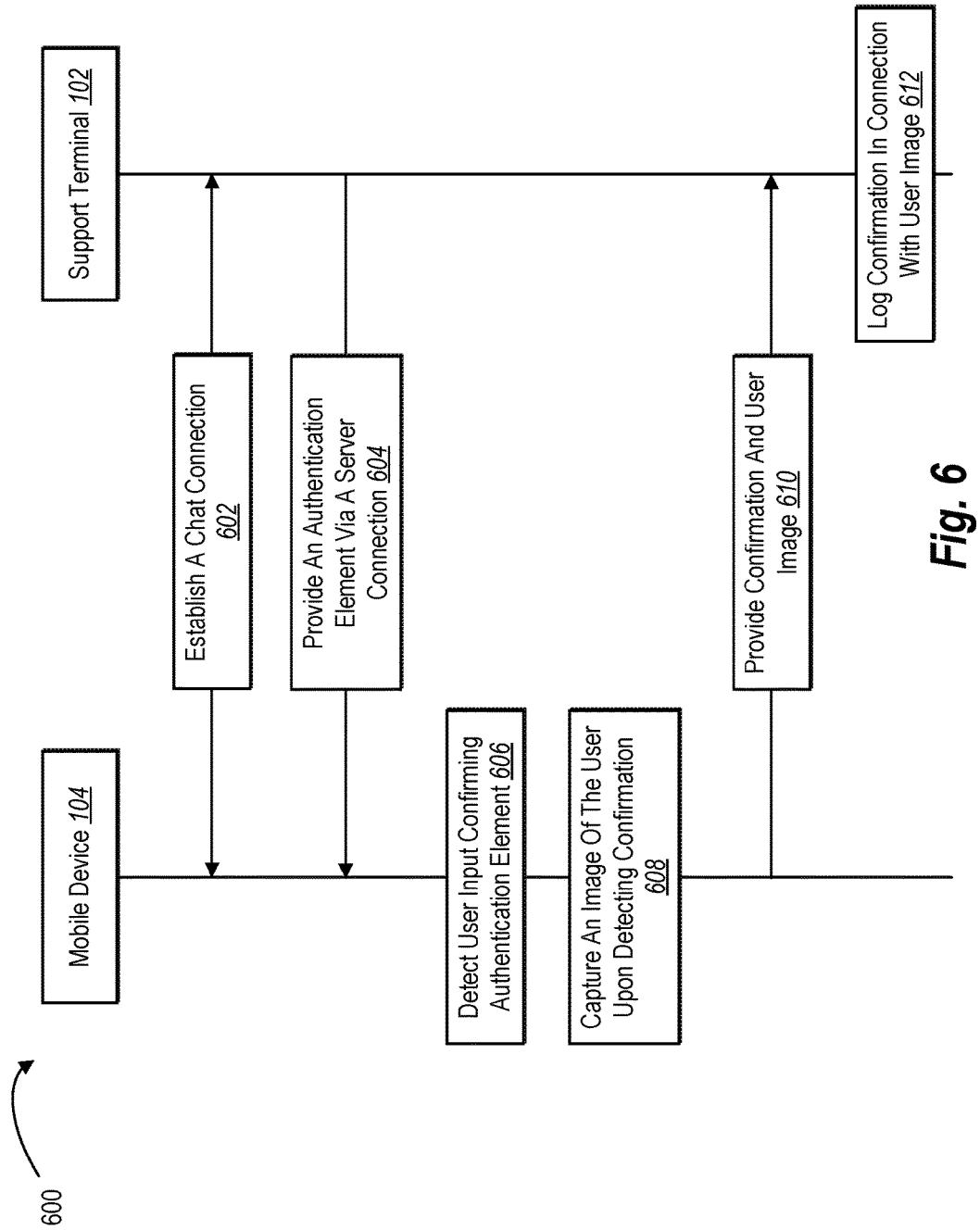

METHODS AND SYSTEMS FOR MULTI-PANE VIDEO COMMUNICATIONS WITH PHOTO-BASED SIGNATURE VERIFICATION

CROSS-REFERENCE TO RELATED APPLICATIONS

The present application is a continuation-in-part of U.S. patent application Ser. No. 15/498,290, filed on Apr. 26, 2017, which is a continuation of U.S. patent application Ser. No. 15/208,576, filed on Jul. 12, 2016 and now issued as U.S. Pat. No. 9,699,406, which is a continuation-in-part of U.S. patent application Ser. No. 29/561,280, filed on Apr. 14, 2016. Each of the aforementioned applications are hereby incorporated by reference in their entirety.

BACKGROUND

Many modern businesses create mobile applications meant to improve accessibility to the business and allow a user to perform some desired function or access information on a mobile device. Some businesses, such as game developers, do business solely through the application itself. Other businesses, such as banks, may create a mobile application merely to provide customers a convenient alternative to visiting a brick and mortar branch of the business.

A frequent problem arises when a user does not know how to perform a desired function or access information on the business's mobile application. New users and users not familiar with technology often run experience frustration when using mobile applications. This frustration may lead a user to abandon the mobile application and, possibly, the business-customer relationship altogether.

More specifically, problems associated with current mobile application technology that commonly add to a user's frustration include a lack of interpersonal communication between the user and a representative of the business. Because a mobile application may generally substitute for face-to-face interaction, a user may have little interaction with any people associated with the business, leading to disconnect between the user and the business. This disconnect can weaken the business-customer relationship.

Additional problems include the continued need for the user to be the principal navigator of the application. Though a user may seek assistance from a customer support representative in interacting with the application, the support representative is generally limited to orally providing instructions to the user. As a result, any rendered assistance fails to alleviate the burden of navigating the application from the user. If the user doesn't understand or cannot follow the instructions, frustration results.

Prior attempts to improve a user's experience have included tutorial slide shows or videos, help documents, guided tours of the site or application, or other similar attempts to familiarize the user with the offered functionality. These solutions, however, typically do not cover every function offered, overload the user with too much information at once, or offer a predetermined explanation with no elaboration if the user does not understand.

Other solutions, such as telephone support, requires the user to either use multiple devices to follow the representative's instructions while on the phone or to write down or memorize the instructions and perform them after the conversation has ended. This limits a user to seeking support only where multiple devices or writing materials are available. For example, often a user may be trying to use a mobile application on their mobile phone. Many mobile phones do not allow a user to talk on a phone call and navigate a mobile application at the same time. Thus, a phone call many not be sufficient to resolve the user's concerns.

Users may attempt to perform a video call or text chat session to obtain help with a mobile application. Again, some devices do not allow for simultaneous video chats and navigation of a mobile application. Furthermore, even if the devices allow for both, the use of two separate applications (the mobile application and a video chat application) require switching back and forth between the video call application and the mobile application, require large amounts of processing power to run both applications, or otherwise lead to a degraded experience.

SUMMARY

One or more embodiments described herein provide benefits and/or solve one or more of the foregoing or other problems in the art with systems and methods for establishing a video connection between a mobile device and a support terminal while also allowing the support terminal to push display elements through a separate connection to the mobile device. In particular, establishing a separate connection providing bi-directional capabilities between the mobile device and support terminal allows the support terminal to push elements directly to the mobile device while maintaining the video connection. Thus, rather than requiring a user of an application on the mobile device to navigate the application to find the display elements, the support terminal pushes these elements directly to the mobile device. In effect, the systems and methods allow a support terminal to remotely control the display of such elements on the mobile device.

Additionally, when the mobile device receives a display element, instructions stored on the mobile device execute, dividing the display of the mobile device into at least a first pane and a second pane. The first pane displays a video chat session and the second pane displays the display element. Thus, the user of the mobile device is able to maintain interpersonal communication with a user of the support terminal while reviewing and/or interacting with the display element/mobile application. In this way, a user of the mobile application is spared the hassle of using multiple devices or memorizing instructions when seeking help in navigating and using the application.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

The detailed description describes one or more embodiments with additional specificity and detail through the use of the accompanying drawings, as briefly described below.

FIG. 6 illustrates a sequence diagram of capturing an image of a user in connection with the user confirming an authentication element in accordance with one or more embodiments.

DETAILED DESCRIPTION

Figure 1:
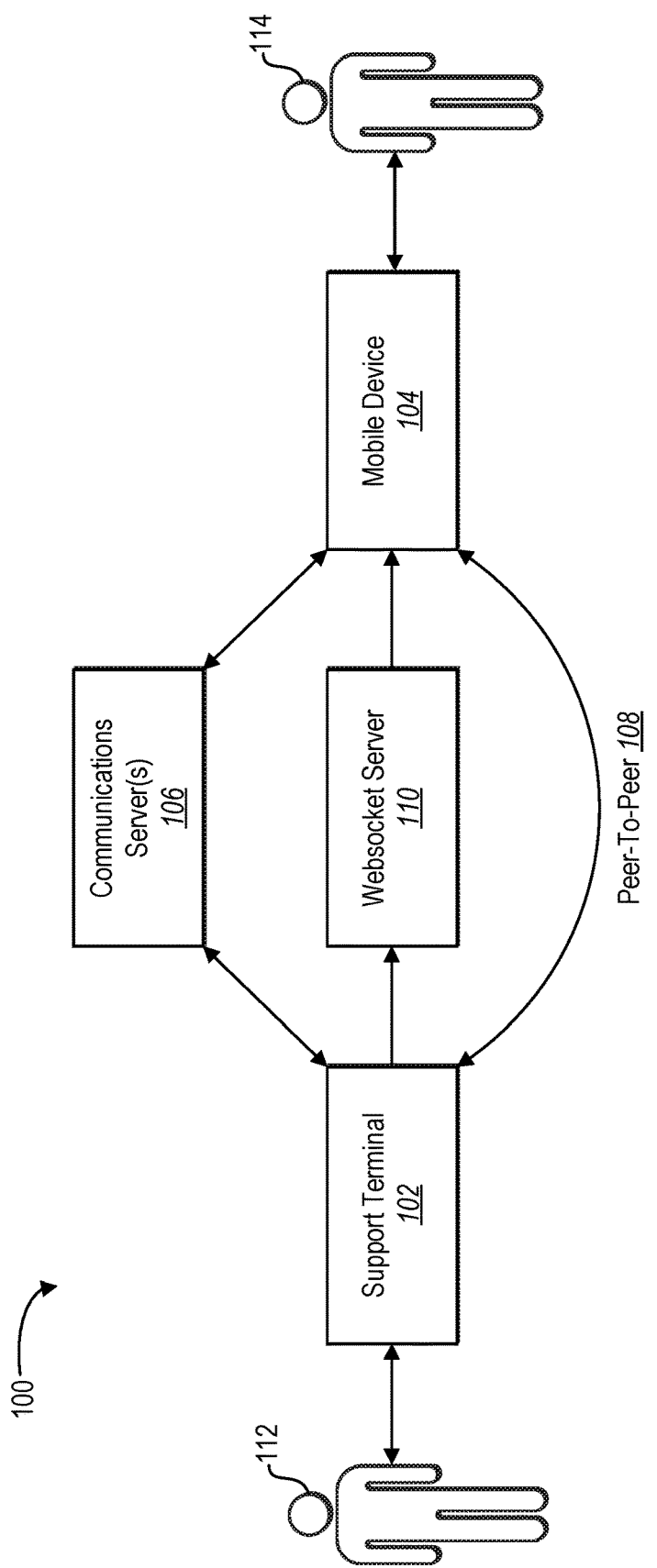
FIG. 1 illustrates a schematic diagram of a communications system in accordance with one or more embodiments.

One or more embodiments described herein include a communications system that enables a single mobile application to use multiple communication connections with a support terminal to provide a video chat while concurrently providing a display element pushed to the mobile device by the support terminal. To illustrate, a user of the mobile device accesses the communications system via the mobile application. In one or more embodiments, a user interface of the mobile application provides a selectable option to request assistance from a support representative via video chat. In response to the user request, the communications system establishes a video chat session between the mobile device and the support terminal. The video chat allows the user to communicate with a support representative using the support terminal and seek help in interacting with the mobile application.

During the video chat session, the communications system enables the support representative to assist by allowing the support terminal to push a display element to the mobile device. A display element may contain information to be viewed or a function to be performed at the mobile device. For example, the display element can comprise a video providing information about a particular service. Alternatively, the display element may contain an interactive feature, such as a fillable form. In one or more embodiments, the communications system provides the display element on the mobile device while concurrently providing the video chat via a multi-pane display of the single mobile application. In this way, the user may receive further assistance while reviewing or interacting with the display element.

More particularly, the communications system initiates a video chat session by establishing a first connection between a mobile device and a support terminal. Once established, the communications system conducts a video chat transmitted through the first connection and provides the video chat for display to both the support terminal and the mobile device. A user of the mobile device and a support representative using the support terminal may then communicate with one another.

Additionally, one or more embodiments of the communications system enable the support terminal to push a display element to the mobile device. For example, in at least one embodiment, the support terminal selects a display element from a set of selectable display elements stored on the support terminal and subsequently pushes the display element to the mobile device. The communications system may transmit the display element to the mobile device through a second connection. For example, the communication system uses a second connection, separate from the first connection to send the display element. One will appreciate in light of the disclosure herein that the use of a separate connection allows the support terminal to push the display element, uses less computing resources, and avoids degrading the video chat.

In response to the mobile device receiving the display element, the mobile application divides a display of the mobile device into multiple panes (e.g., two or more panes). In at least one embodiment, the mobile application divides the display into at least a first pane and a second pane. The communications system then provides the video chat in the first pane while concurrently providing the display element in the second pane.

By concurrently providing a video chat and a display element, the communications system enables a support representative to more effectively guide a user of a mobile device through the entire process of interacting with a mobile application. In this way, the user avoids navigating an unfamiliar mobile application and, as a result, avoids possible frustration. Additionally, by using a connection that provides bi-directional communication, the support terminal provides the information or function directly to the mobile device. Bi-directional communication gives the communications system advantages over a more traditional system in which a client device polls a server for data. In such traditional systems, a server may not initiate communication with a mobile device, but may only respond to a request. Using a bi-directional connection, the communications system allows the support terminal to immediately provide an available display element to the mobile device, rather than wait for a request. Thus, one or more embodiments provide for quicker processing/sending of display elements to a mobile device.

Further, the mobile device displays the video chat and the display element concurrently using the same mobile application, and thus, requires fewer computer resources than a conventional system—such as memory, processing power, and display space—thus allowing a limited set of computer resources to perform functions faster than before. In particular, a user need not have a separate video chat application running together with the mobile application.

Though the discussion herein includes implementations of the methods and systems in the context of a mobile banking application, it will be appreciated that this context is merely illustrative and that the uses of the methods and systems described extend beyond a banking application to other non-banking mobile applications.

FIG. 1 illustrates an example implementation of a communications system 100 (or simply "system 100"). As illustrated in FIG. 1, the system 100 comprises a support terminal 102, a mobile device 104, communication server(s) 106, a peer-to-peer connection 108, and a Web Socket server 110. As is also illustrated in FIG. 1, a support representative 112 and a mobile device user 114 may interact with the support terminal 102 and the mobile device 104 respectively to access content on the respective devices and communicate with one another.

As shown in FIG. 1, the system 100 includes the support terminal 102. The support terminal 102 may comprise a computing device, such as those described below in relation to FIG. 12. For example, the support terminal 102 may comprise one or more personal computers, laptop computers, mobile devices, mobile phones, tablets, special purpose computers, televisions, or other computing devices.

The mobile device 104 may comprise any mobile computing device, such as those described below in relation to FIG. 12. In one or more embodiments, the mobile device 104 includes a handheld client device. As used herein the term "handheld device" refers to a device sized and configured to be held/operated by a single hand of a user. For example, the mobile device 104 can include a smartphone, a tablet computing device, or another mobile computing device.

Additionally, the system 100 also includes the communications server(s) 106. The communications server(s) 106 may store, receive, and transmit any type of data, including a display element, a video data, or a video chat request. For example, the communications server(s) 106 may receive and transmit a request for a video chat from the mobile device 104 to the support terminal 102. The communications server(s) 106 can also transmit video data between one or more devices, such as the support terminal 102 and the mobile device 104.

As illustrated, the communications server(s) 106 serves to establish a connection between the support terminal 102 and the mobile device 104. For example, the communications server(s) 106 may establish a connection in response to a video chat request sent by the mobile device 104. In particular, the communications server(s) 106 establish the connection to allow transmission of a video chat between the support terminal 102 and the mobile device 104. For example, once the communications server(s) 106 establishes the connection, the system 100 conducts a video chat between the support terminal 102 and the mobile device 104 through the connection. The support representative 112 and the mobile device user 114 may interact with the support terminal 102 and the mobile device 104 respectively to communicate with one another via the video chat.

As illustrated, in one or more embodiments, the communication server(s) 106 comprises one server. Alternatively, the communications server(s) 106 may comprise a series of servers. For example, the communications server(s) 106 may comprise a video load balanced server, a signaling server, and a STUN/TURN server. The video load balanced server serves to direct communications to an available support terminal, the signaling server notifies the available support terminal of a video chat request, and the STUN/TURN server serves to work through secure firewalls to establish the connection. Alternatively, any other combinations and types of servers sufficient to establish a connection may be used as part of the communication server(s) 106.

As illustrated, the system 100 also includes the peer-to-peer connection 108. The peer-to-peer connection 108 serves as a direct connection between the support terminal 102 and the mobile device 104. In one or more embodiments, the peer-to-peer connection 108 may serve to substitute the communication servers(s) 106. In particular, after the communication server(s) 106 establishes the connection between the support terminal 102 and the mobile device 104, the system 100 may subsequently establish the peer-to-peer connection 108 and conduct the video chat over the peer-to-peer connection. As used herein, a peer-to-peer (P2P) connection is created when two or more client computing devices are connected and share resources without going through a separate server computing device (like the communication server(s) 106).

The peer-to-peer connection 108 can provide a solution to bandwidth limitations that restrict the maximum number of concurrent video streams possible through the communication server(s) 106. The peer-to-peer connections, where possible, maximize the number of possible simultaneous video calls.

In one or more embodiments, the communication server(s) 106 may first determine if the peer-to-peer connection 108 is available. For example, the peer-to-peer connection 108 may be unavailable due to limitations or the configuration of the hardware or software within the system 100. For example, video relays between client devices on restrictive networks and firewalls are often blocked. Network address translation limits the client device's ability to have peer-to-peer connections. In one or more embodiments, the system detects when a peer-to-peer connection is not possible. If the communication server(s) 106 determines that the peer-to-peer connection 108 is not available, then the communications server(s) 106 may maintain (or reroute) the connection for the video chat via the communication servers(s) 106. In an alternative embodiment, the communications server(s) 106 may maintain the first connection whether or not the peer-to-peer connection 108 is available.

As is also illustrated in FIG. 1, the system 100 may also include the Web Socket server 110. The Web Socket server 110 may generate, store, receive, and transmit any type of data, including a display element (not shown). For example, the Web Socket server 110 may receive and push a display element sent from the support terminal 102 to the mobile device 104.

As FIG. 1 illustrates, the Web Socket server 110 provides a second connection between the support terminal 102 and the mobile device 104. In particular, the Web Socket server 110 provides a bi-directional connection, also known as a full-duplex connection, enabling support terminal 102 to push data to the mobile device 104, rather than requiring support terminal 102 to wait for a request from the mobile device 104, as is done in some traditional client/server systems. Though FIG. 1 illustrates an embodiment where the second connection is established through a Web Socket server 110, one with ordinary skill in the art will appreciate that any type of server or device that enables the support terminal 102 to push a display element to the mobile device 104 can be used as a substitute for the Web Socket server 110.

FIG. 1 further illustrates an embodiment where the second connection is a persistent connection, consistently maintained by the Web Socket server 110 after it has been established. A persistent second connection may be established before, after, or at the same time, the first connection is established. One or more embodiments of the system 100 may wait until the support terminal 102 initiates transmission of a first display element before it establishes the second connection through the Web Socket server 110. As an alternative to a persistent second connection, the system 100 may create the second connection through the Web Socket server 110 only when required to transmit data from the support terminal 102 to the mobile device 104. In this alternative embodiment, system 100 may wait until the support terminal 102 initiates transmission of data to the mobile device 104. When the transmission is initiated, the system 100 then creates the second connection through the Web Socket server 110, waits until the transmission terminates, and then severs the second connection.

Figure 2:
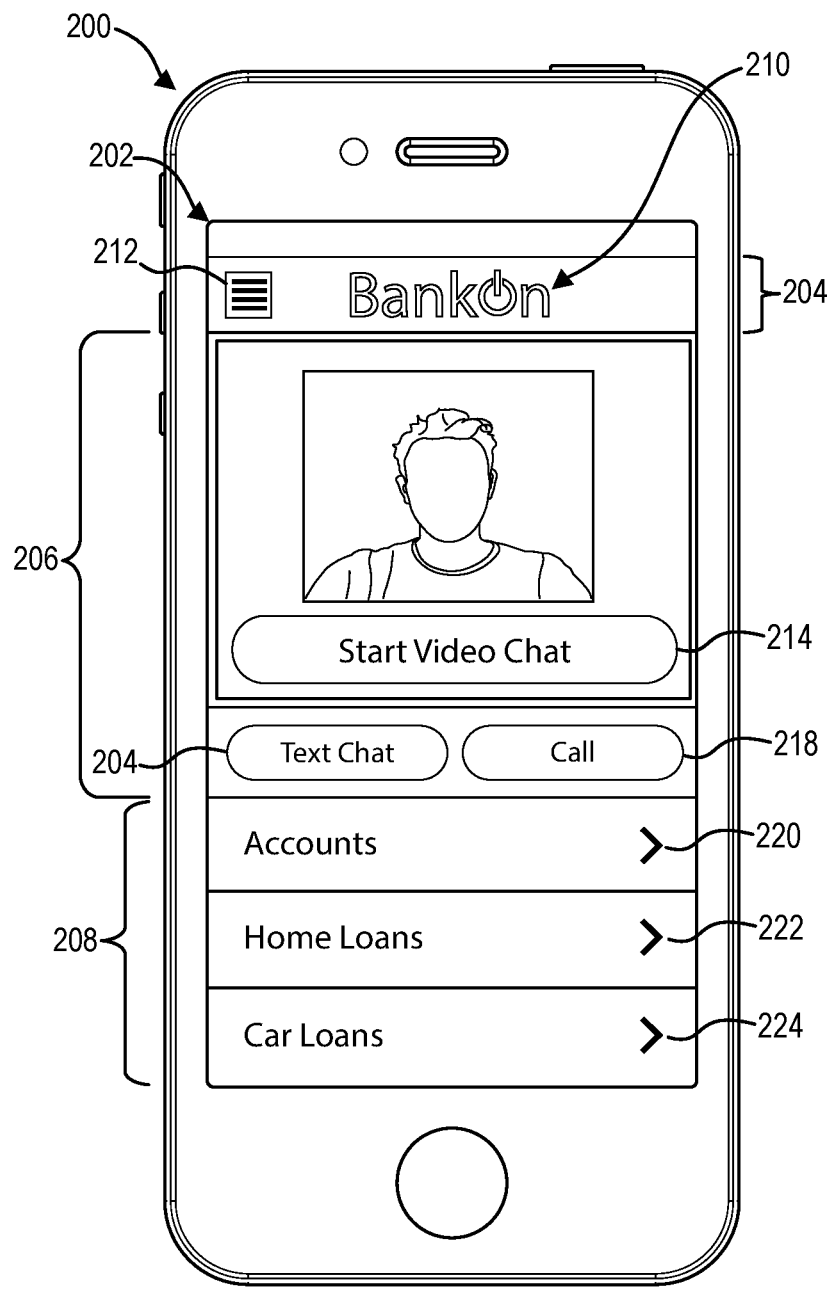
FIG. 2 illustrates a mobile device displaying an application user interface operable to enable a mobile device user to interact with a mobile application in accordance with one or more embodiments.

FIG. 2 illustrates a mobile device 200 displaying an application user interface 202 operable to allow a user (e.g., the mobile device user 114) to interact with the mobile application in accordance with one or more embodiments. The mobile device 200 can represent an embodiment of the mobile device 104 described above. In some embodiments, the mobile device 200 is a mobile phone or tablet device. Additional description regarding mobile devices is provided below in connection with FIG. 12.

As shown, the application user interface 202 includes a header portion 204, a customer support portion 206, and a navigation portion 208. In alternate embodiments, the application user interface 202 may include any other portions relevant to the mobile application. The header portion 204 of application user interface 202 provides general information and options for the user. As FIG. 2 illustrates, the header portion 204 includes a title 210 and a selectable menu element 212. The title 210 provides the text or a graphic, such as the title of a business. Alternatively, in some embodiments, the title 210 provides the name of the mobile application or any other title deemed sufficient for the purposes of the mobile application. The selectable menu element 212 provides a drop-down menu with pre-selected options for interacting with the mobile application. For example, the drop-down menu provides the user with an option of logging into a user account or navigating to a home page of the mobile application. In one or more alternative embodiments, selectable menu element 212 may be replaced with links in the header portion 204 providing the user with similar options.

Customer support portion 206 an option to contact a support representative 112 to receive assistance. For example, a user who is unfamiliar with a mobile application may need assistance in finding information or performing a desired function. By way of illustration, in the context of a mobile banking application, the user may require help in finding account balances, performing a check deposit, making a credit card payment, or interacting with the mobile application in another way.

As illustrated in FIG. 2, the customer support portion 206 includes multiple selectable buttons the user can select to contact a support representative 112. For example, the customer support portion 206 of FIG. 2 includes a video chat button 214, a text chat button 216, and a phone call button 218, which the mobile application may use to initiate a video chat, a text chat, or a phone call respectively. In response to a selection, the mobile device 200 sends a request to initiate a communications session of the type associated with the button. For example, by selecting the video chat button 214, the mobile device 200 sends a request to begin a video chat session with the support representative 112.

Alternatively, the customer support portion 206 may include other selectable buttons to contact the support representative 112, such as an option to e-mail or send a voice-recorded message. It will also be appreciated that any number of selectable buttons may be present in the customer support portion 206 in any combination. To illustrate, the customer support portion 206 may include selectable buttons for video chat, text chat, phone call, and email message, or the customer support portion 206 may only include the video chat button 214.

The navigation portion 208 presents the user with quick navigational options. For example, the navigation portion 208 of FIG. 2 presents options to navigate to a page comprising information on accounts 220, information on home loans 222, or information on car loans 224. In one or more embodiments, other options deemed useful to the user may also be present.

Figure 3:
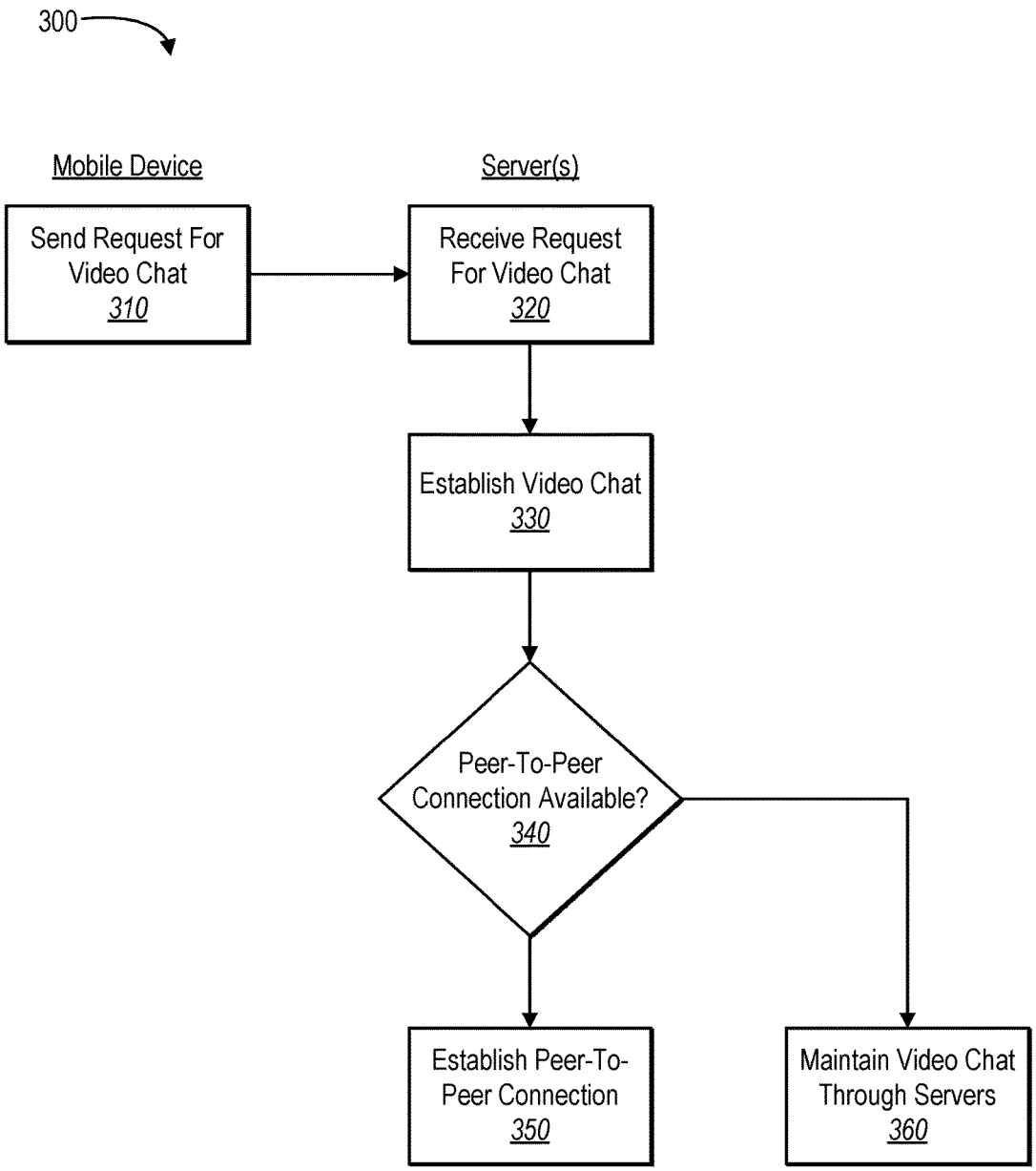
FIG. 3 illustrates a flowchart of a series of acts in a method of initiating a video chat connection between a mobile device and a support terminal in accordance with one or more embodiments.

As mentioned previously, one or more embodiments include a video chat between a mobile device and a support terminal. FIG. 3 illustrates a flowchart of a series of acts in a method 300 of initiating a video chat connection between a mobile device (e.g., mobile device 104) and a support terminal (e.g., support terminal 102) in accordance with one or more embodiments. The method 300 is intended to be illustrative of one or more methods in accordance with the present disclosure and is not intended to limit potential embodiments. Alternative embodiments can include additional, fewer, or different steps than those articulated in FIG. 3.

As illustrated in FIG. 3, the method 300 includes an act 310 of sending a request to initiate a video chat from a mobile device. The request can initially be processed by a series of one or more servers, such as the communication server(s) 106 of FIG. 1. As discussed above, communication servers may contain a load balance server, a signaling server, and a STUN/TURN server. Alternatively, the request may be sent through a single server that performs the same functionality as the combination of servers. In particular, the act 310 includes sending a request from the mobile device to initiate a video chat between the mobile device and a support terminal 102.

Moreover, as illustrated in FIG. 3, the method 300 also includes an act 320 of a receiving the request to initiate a video chat. Furthermore, FIG. 3 illustrates that the method 300 also includes an act 330 of establishing a video chat between the mobile device and a support terminal. In particular, the act 330 comprises establishing a first connection between the mobile device and the support terminal and conducting a video chat transmitted across the first connection. In particular, the first connection can comprise a connection established through communication servers, as described above.

As shown in FIG. 3, the method 300 also includes the act 340 of determining whether a peer-to-peer connection is available between the mobile device and the support terminal. In response to determining that a peer-to-peer connection is available, the method 300 proceeds to the act 350 of establishing a peer-to-peer connection between the mobile device and the support terminal. In particular, the act 350 switches the video chat from being conducted via a communication connection through the communication servers to a peer-to-peer connection. In one or more embodiments, the act 350 may include severing the connection through communication servers after the peer-to-peer connection has been established between the mobile device and the support terminal 102. One will appreciate in light of the disclosure herein that the use of a peer-to-peer connection to conduct the video chat can reduce system resources need for the video chat, provide greater flexibility, and in some cases, allow for quicker communication between the mobile device and the support terminal.

Alternatively, in response to determining that a peer-to-peer connection is not available, the method 300 proceeds to the act 360 of maintaining the video chat through the communication servers. In one or more embodiments, the video chat may be maintained through the series of servers whether or not a peer-to-peer connection is available.

Figure 4:
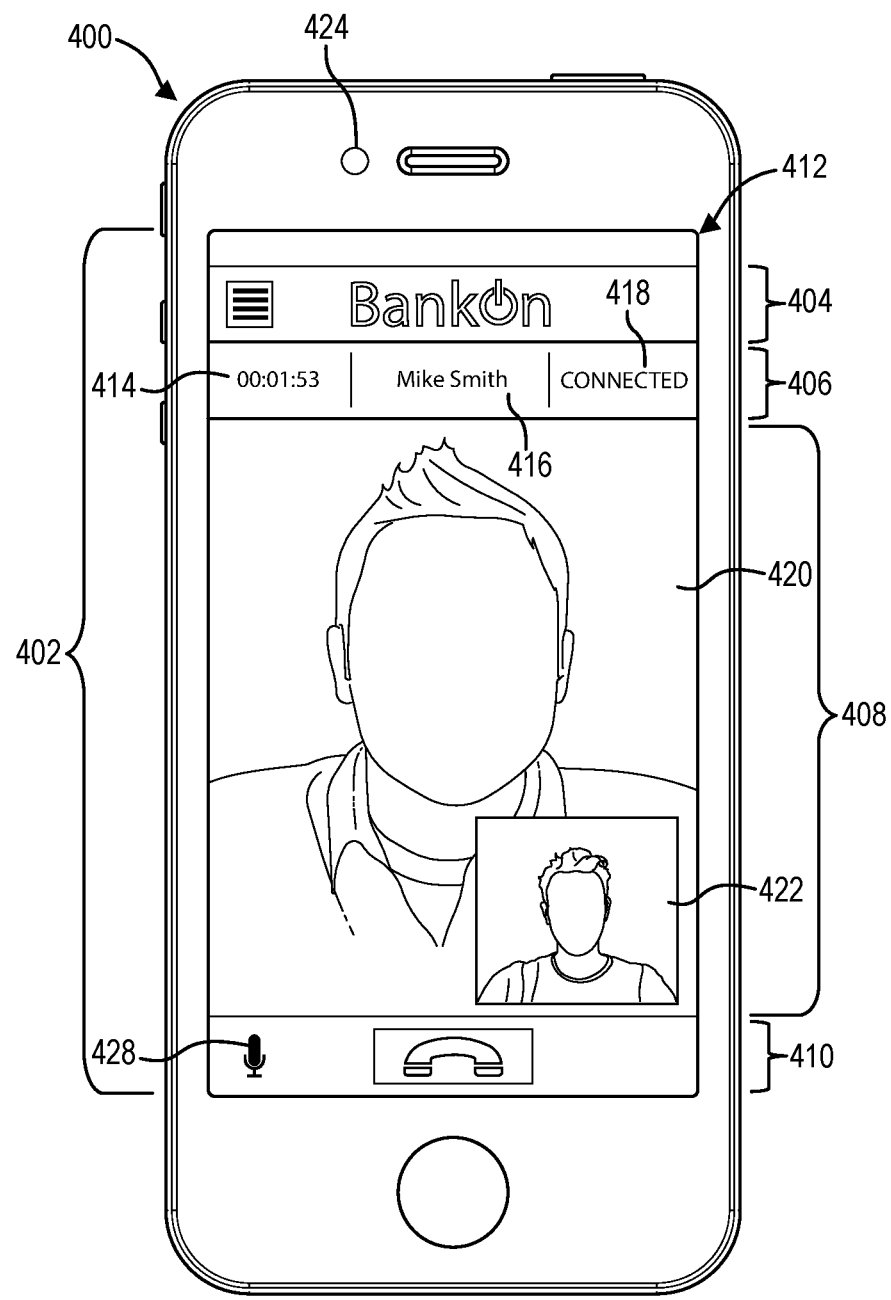
FIG. 4 illustrates a mobile device displaying a video chat interface in accordance with one or more embodiments.

FIG. 4 illustrates a mobile device 400 displaying a video chat interface 402 after a video chat has been established between a mobile device and a support terminal. The video chat interface 402 includes a heading portion 404, a session information portion 406, a video chat display portion 408, and a session control portion 410. As illustrated in FIG. 4, the video chat interface 402 utilizes the entirety of the mobile device display screen 412. In one or more alternative embodiments, the video chat interface utilizes less than the entirety of the mobile device display screen 412 in response to receiving a default display element (not shown) from a support terminal immediately after the video chat is established.

As illustrated in FIG. 4, the session information portion 406 of the video chat interface 402 displays information regarding the video chat session conducted between the mobile device and the support terminal. In particular, the session information portion 406 includes a time-keeping portion 414, a support representative identity portion 416, and a connection status portion 418. The time-keeping portion 414 displays the duration of the current video chat session. The support representative identity portion 416 displays the name of the support representative engaging in the video chat session. The connection status portion 418 displays the status of the connection between the mobile device and the support terminal. In one or more embodiments, the connection status portion 418 can indicate whether the video chat is being conducted via a peer-to-peer connection or not.

As illustrated in FIG. 4, the video chat display portion 408 includes a support representative display 420 and a mobile device user display 422. In particular, the support representative display 420 displays video content captured by the support terminal. The mobile device user display 422 displays video content captured by a camera 424 of the mobile device 400. As shown in FIG. 4, mobile device user display 422 is displayed in a lower right corner of the video chat display portion 408. Alternatively, the mobile device user display 422 may be displayed in any other location of the video chat display portion 408. In one or more embodiments, the mobile device user display 422 may be relocated to any location in response to detecting a user interaction. For example, a user may select and, with a dragging motion, relocate the mobile device user display 422 to any other location.

As further illustrated in FIG. 4, the session control portion 410 of the video chat interface 402 includes a session end option 426 and a microphone mute option 428. Alternatively, one or more embodiments may include other options, such as a record option to record the audio content, visual content, or both from the video chat session.

Once a video chat is established between the mobile device and the support terminal, the support representative may desire to send a display element to the user of the mobile device. FIGS. 5A-5F provide various exemplary embodiments of a mobile device 500 displaying a dual pane display 502 in response to receiving various display elements 504a-504f from a support terminal. In particular, as part of receiving the display element, the mobile device 500 receives a trigger that causes the mobile device 500 to initiate the dual pane display. The trigger can comprise a piece of JavaScript or other code, which when received by the mobile device, causes the mobile device to split the display into multiple panes. More specifically, the trigger can cause the mobile device 500 to execute code previously installed on the mobile device 500 as part of the mobile application. Such code can cause the mobile device 500 to provide multiple panes as described hereinafter.

As illustrated in FIGS. 5A-5F, the mobile devices 500 divides the mobile device display screen 506 into a first pane 508 and a second pane 510. As illustrated in these figures, the mobile device provides the video chat in the first pane 508 and display elements 504a-5f in the second pane 510. Alternatively, the mobile device 500 may divide the display screen 506 into additional panes in response to receiving multiple display elements simultaneously or in response to receiving a display element formatted to use multiple panes.

In one or more embodiments, a mobile device user may choose to accept or reject a display element upon the display element being displayed in the second pane 510. For example, in response to receiving one of the display elements 504a-504f and/or an accompanying trigger, the mobile device 500 divides the display screen 506 into a first pane 508 and a second pane 510. As part of presenting the second pane 510 to the user, the mobile device 500 also displays selectable options to the user to either accept or reject the display element in the second pane 510. In these embodiments, the mobile device 500 display one or more of the display elements 504a-504f only when the user selects to accept it. Otherwise, if the user chooses to reject the display element, the mobile device 500 can converge the first pane 508 and the second pane 510 back into a single display (such as that shown in FIG. 4).

Additionally, the mobile device 500 may modify the size of the first pane 508 and the second pane 510 (or of additional panes) on the display screen 506 based on the display element received. For example, a received display element may require more than half of the display screen 506. As a result, the mobile device 500 apportions the first pane 508 and the second pane 510 such that the second pane 510 fills the majority of the display space of the display screen 506 and the first pane 508 fills the remaining space available. In some embodiments, one of the panes is shown within the other pane (e.g., picture-in-picture).

In one or more embodiments, a mobile device user may modify one of the display elements 504a-504f For example, a display element changes as the user of the mobile device interacts with it. Alternatively, a display element may be static and such as a view-only content within the display element. In some embodiments, providing and modifying one of the display elements 504a-504f may occur independently of any interaction with the video chat provided in the first pane 508. Specifically, when the support terminal provides a display element via a second server connection (e.g., a via a WebSocket server connection), communications via the second server connection can be independent of the first video chat connection.

Figure 5A:
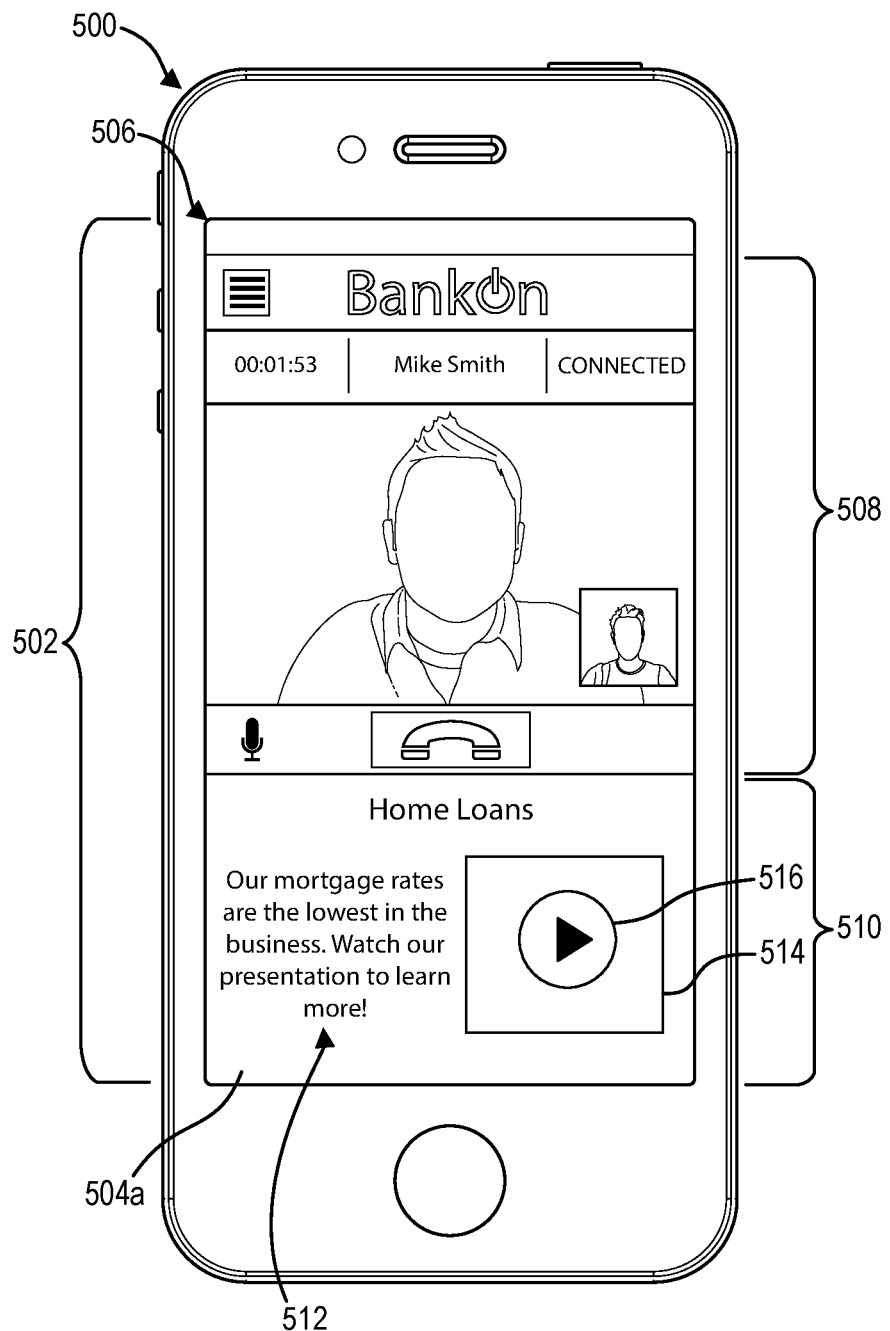
FIGS. 5A-5F illustrates a mobile device displaying various views of a dual pane display in accordance with one or more embodiments.

As shown in FIG. 5A, the first display element 504a is an informational slide comprising text and graphics. In particular, the first display element 504a includes a text portion 512 and a video portion 514. The first display element 504a provides exemplary information regarding a banking service provided by the mobile application. By way of illustration, the first display element 504a displays information regarding mortgage rates.

The video portion 514 plays an informational video in response to a user interaction. For example, the mobile device 500 plays the video portion 514 in response to detecting a user selection of a play button 516. Additionally, or alternatively, the mobile device 500 play the video portion 514 in response to detecting a user swiping gesture or a user voice command. In another example, the mobile device 500 plays the video immediately after the first display element 504a is displayed in the second pane 510 (e.g., auto-play). In one or more alternative embodiments, the first display element 504a includes only a text portion (including the text of a document), a video portion, or a non-video graphics portion (e.g., images or animations).

Figure 5B:
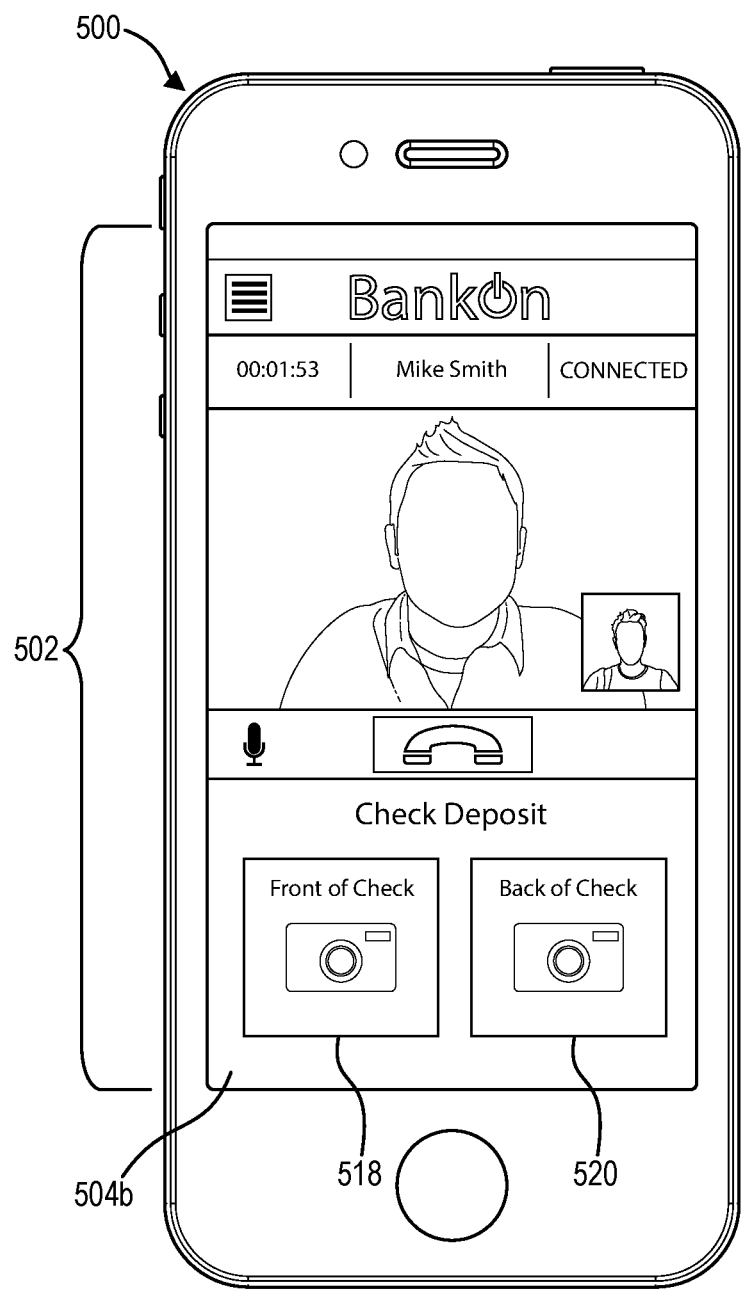

FIG. 5B illustrates another embodiment of the mobile device 500 displaying a dual pane display 502. In particular, the mobile device 500 provides a second display element 504b in the second pane 510 with an interface for capturing multiple images for check deposit. In particular, the second display element 504b comprises a first selectable element 518 and a second selectable element 520, wherein the first selectable element designates a captured image as a front view of a check and the second selectable element 520 designates a captured image as a back view of a check. Upon detecting a user selection of the first selectable element 518 or the second selectable element 520, the video chat provided in the first pane 508 overlays the display of the video chat with a viewfinder display (not shown), wherein the viewfinder display provides a representation of image data captured by a camera (e.g., a camera on the back of the mobile device 500).

In some embodiments, when the mobile device 500 receives the second display element 504b from the support terminal, the mobile device 500 also receives a camera trigger that immediately activates the camera and overlays the video chat in the first pane 508 with the viewfinder display. In these and other embodiments, while the first pane 508 provides the viewfinder mode, the video chat may be continuously received by the mobile device 500. Alternatively, the visual data from the video chat may temporarily pause until a user indicates that capturing images is done. Additionally, or alternatively, the audio from the video chat transmission is still available while the mobile device user captures the images, so that the support representative may guide the mobile device user through the process.

Upon the mobile device 500 capturing an image of the check, the mobile device 500 automatically sends the image to the support terminal for verification and check deposit. Alternatively, in one or more embodiments, the second display element 504b may include an additional button for sending an image file that has been captured to the satisfaction of the mobile device user.

In some embodiments, the mobile device 500 employs the second display element 504b to capture images of documents other than checks. For example, in one or more embodiments, the second display element 504b may enable a user to capture an image of a contract, or any other document that may be required by the support representative. As another example, the mobile device 500 employs the second display element 504b to capture one or more forms of identification associated with the user (e.g., licenses, certificates, or photos).

Figure 5C:
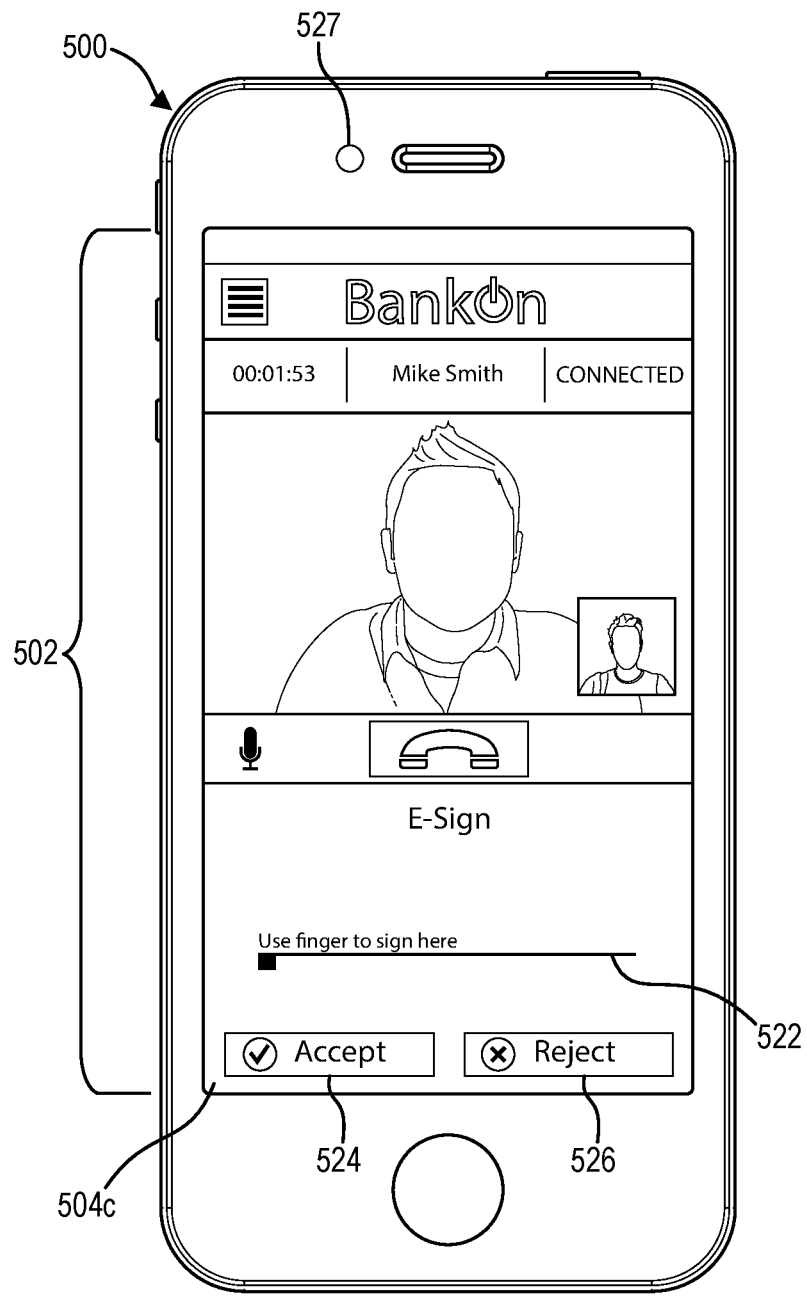

FIG. 5C illustrates another embodiment of the mobile device 500 displaying a dual pane display 502. In particular, the mobile device 500 provides a third display element 504c in the second pane 510 that is a signature pad enabling a user to enter a signature. In particular, the third display element 504c is an authentication element that includes a signature line 522, an accept graphical element 524, and a reject graphical element 526. In some embodiments, the mobile device 500 displays the authentication element within the third display element 504c upon receiving a trigger from the support terminal, as described above, to provide the authentication element to the user.

In one or more embodiments, the authentication element in the third display element 504c changes, in response to detecting a user interaction along the signature line 522, such as the user providing their signature. To illustrate, a user may use a finger, a stylus, a computer mouse, or another user input device to enter a signature on the signature line 522. After providing user input, the user may select to accept or reject the authentication element. Upon detecting a user selection of the accept graphical element 524, the mobile device 500 determines that the user confirms the authentication element. In addition, the mobile device 500 provides the user input (e.g., user signature) to the support terminal.

Upon detecting a selection of the reject graphical element 526, the mobile device 500 changes the third display element 504c to a different display element or content, such as the previously displayed display content within the display element. In some embodiments, the reject graphical element 526 changes to a "clear" graphical element upon the user entering user input to the signature line 522. In this manner, upon selecting the clear graphical element, the mobile device 500 clears the signature line 522 for the user to sign again.

In some embodiments, rather than directly receiving user input on the signature line 522, the mobile device 500 enables the user to capture an image of their signature from a physical medium (e.g., paper) and transfer the signature to the signature line 522. For example, the mobile device 500 uses a camera to capture an image of a user's signature. The mobile device 500 overlays the image on the third display element 504c such that mobile device 500 displays both the image from the camera and the authentication element within the second pane 510. In this manner, the user can align the signature in the camera view (e.g., as it appears on a physical piece of paper) with the signature line 522 of the authentication element. Further, upon aligning the image of the signature with the signature line 522, the user can select the accept graphical element 524 to embed the image of the signature from the paper onto the signature line 522. Then, as described above, the mobile device 500 provides the user input to the support terminal.

As described above, the mobile device 500 can send the user input (e.g., signature) to the support terminal. In one or more embodiments, the mobile device 500 sends an image or file of the user input separately to the support terminal (e.g., the signature without the signature line 522 or content from the third display element 504c). In alternative embodiments, the mobile device 500 sends the image or file of the user input overlaid on or embedded in the third display element 504c. For example, the mobile device 500 captures an image of the third display element 504c with the signature upon detecting the user selecting the accept graphical element 524.

In addition, the mobile device 500 can send the user input to the support terminal via a separate connection than the connections used to facilitate the video chat and to receive the third display element 504c. For example, the mobile device 500 employs a separate secure connection to send the user's signature to the support terminal. In some cases, the mobile device 500 encrypts or otherwise protects the user input before sending it over to the support terminal via an existing or separate connection.

Additionally, or alternatively, the mobile device 500 can provide the user input to a database repository. For example, the support terminal provides the mobile device 500 with instructions to provide the signature to a database repository. The database repository may be hosted within or outside a system that hosts the support terminal. In some embodiments, the mobile device 500 provides the user input (e.g., signature) to the database repository in a separate connection as described above. Further, upon sending the user input to the database repository, the mobile device 500 can provide the support terminal with an indication that the user input (e.g., confirmation of the authentication element) is stored in the database repository.

In addition to capturing and providing user input confirming the user's acceptance of the provided authentication element, in one or more embodiments, the mobile device 500 provides visual confirmation to the support terminal. In particular, the mobile device 500 captures and provides an image of the user as they are inputting the user input, which is then sent to the support terminal. In this manner, the support terminal can store the user input (e.g., signature) in connection with the captured image of the user to visually confirm the user's confirmation of the authentication element.

In some embodiments, the mobile device 500 uses a camera 527 located on the mobile device 500 to capture an image of the user as they provide their signature on the signature line 522 and/or select the accept graphical element 524. The camera 527 can be the same or a different camera that captures images of the user for the video chat in the first pane 508. For example, when using the same camera as used for the video chat, the mobile device 500 captures a matching image as shown in a mobile device user display 529 provided in the first pane 508.

When using another computing device, such as a desktop computer, the computing device uses a peripheral camera to capture the user's image while the user provides user input in response to the authentication element. As mentioned above, the peripheral camera may be the same device used to capture the user's image for the video chat with the support representative. Alternatively, the computing device may use a separate peripheral device to capture an image of the user as the user provides user input to the authentication element shown in the third display element 504*c*.

The mobile device 500 can prompt the user for their approval of the captured image before providing the image to the support terminal or database repository. For example, upon selecting the accept graphical element 524, the third display element 504*c* includes one or more interactive prompts that assist the user in capturing and accepting their image (e.g., within the first pane 508, second pane 510, or another pane). Alternatively, upon selecting the accept graphical element 524, the mobile device 500 captures and displays an image of the user that will be provided to the support terminal along with additional graphical elements to accept the captured image, retake the image, or reject the authentication element.

In alternative embodiments, the mobile device 500 can capture and provide the image of the user without the user's acceptance of the captured image. For example, upon providing user input on the signature line 522 and/or selecting the accept graphical element 524, the mobile device 500 captures and provides the image of the user the support terminal or database repository. In some instances, as part of receiving the authentication element within the third display element 504*c*, the third display element 504*c* informs the user that their picture will be provided along with their signature (i.e., user input) as visual confirmation of their acceptance of the authentication element.

In some embodiments, the mobile device 500 captures and overlays the image of the user in connection with providing the authentication element within the third display element 504*c*. For example, the mobile device 500 shows the captured image behind the signature line 522 within the second pane 510. In this manner, the user provides the user input on top of the captured image, to visually confirm their identity and acceptance of the authentication element.

The mobile device 500 can provide the captured image to the support terminal over a shared or separate connection as the second pane 510 and/or user input. For example, the mobile device 500 provides the user input (e.g., signature) and captured image over the same connection as used to provide the third display element 504*c* and/or authentication element. In another example, the mobile device 500 provides the user input and captured image over a shared but separate secure connection. In still another example, the mobile device 500 provides the captured image over an independent connection.

Additionally, or alternatively, the support terminal may capture an image of the user as they provide user input and/or select the accept graphical element 524 on the mobile device 500. For example, upon the user selecting the accept graphical element 524, the mobile device 500 provides an indication or signal to the support terminal, which then captures an image of the user as shown in the video chat. In this manner, the support terminal can employ the existing video chat connection to capture the user's image and prevent the mobile device 500 from needing to send additional and possibly redundant data.

In one or more embodiments, the support terminal employs facial detection and/or recognition technology on a captured image of the user. For example, in some embodiments, the support terminal uses facial detection to verify that the captured image includes a human face (e.g., by identifying the presence of one or more facial features). In various embodiments, the support terminal uses facial recognition to verify that the image is of the user (e.g., by comparing the captured image to a stored profile picture of the user). If the support terminal does not detect a face and/or confirm the user's facial identity, the support terminal can instruct the mobile device 500 to recapture the user's image and/or provide a notification to the user indicating such.

Upon receiving (either directly or from the mobile device 500) a captured image, the support terminal can store the captured image of the user in association with the received user input (e.g., user signature). For example, the support terminal stores the received user input and captured image in a database, such as a database repository. Additional detail regarding storing and logging this received data is provided below with respect to FIG. 7.

As mentioned above, in some embodiments, the mobile device 500 (or support terminal) captures one or more pictures (or a video) of the user as they provide user input to the authentication element. For example, the mobile device 500 captures multiple images as the user provides their signature for a document and confirms their signature. The mobile device 500 can provide each of the captured images to the support terminal. Alternatively, the mobile device 500 selects a preferred picture to provide to the support terminal. The mobile device 500 can select a preferred picture base on one or more factors, such as image clarity, facial position, obstructions, detected facial features, and/or lighting.

In some embodiments, in addition to providing a captured image along with the user input, the mobile device 500 provides another form of confirmation. For example, the mobile device 500 provides captured audio of the user confirming the authentication element. As another example, the mobile device 500 captures and provides a biometric confirmation (e.g., fingerprint or iris scan). In alternative embodiments, the mobile device 500 provides the other form of confirmation along with the user input in place of the captured image.

Further, as previously mentioned, the support terminal often provides the authentication element to the mobile device 500 to display in the second pane 510. In one or more embodiments, the support representative in the video chat selects and provides the authentication element to the mobile device 500. In some embodiments, the authentication element is provided as part of a pipeline or flow (e.g., mortgage application), where the authentication element is the next element to be displayed. In various embodiments, the support terminal automatically selects and provides the authentication element based on a combination of factors, such as those described above.

Figure 5D:
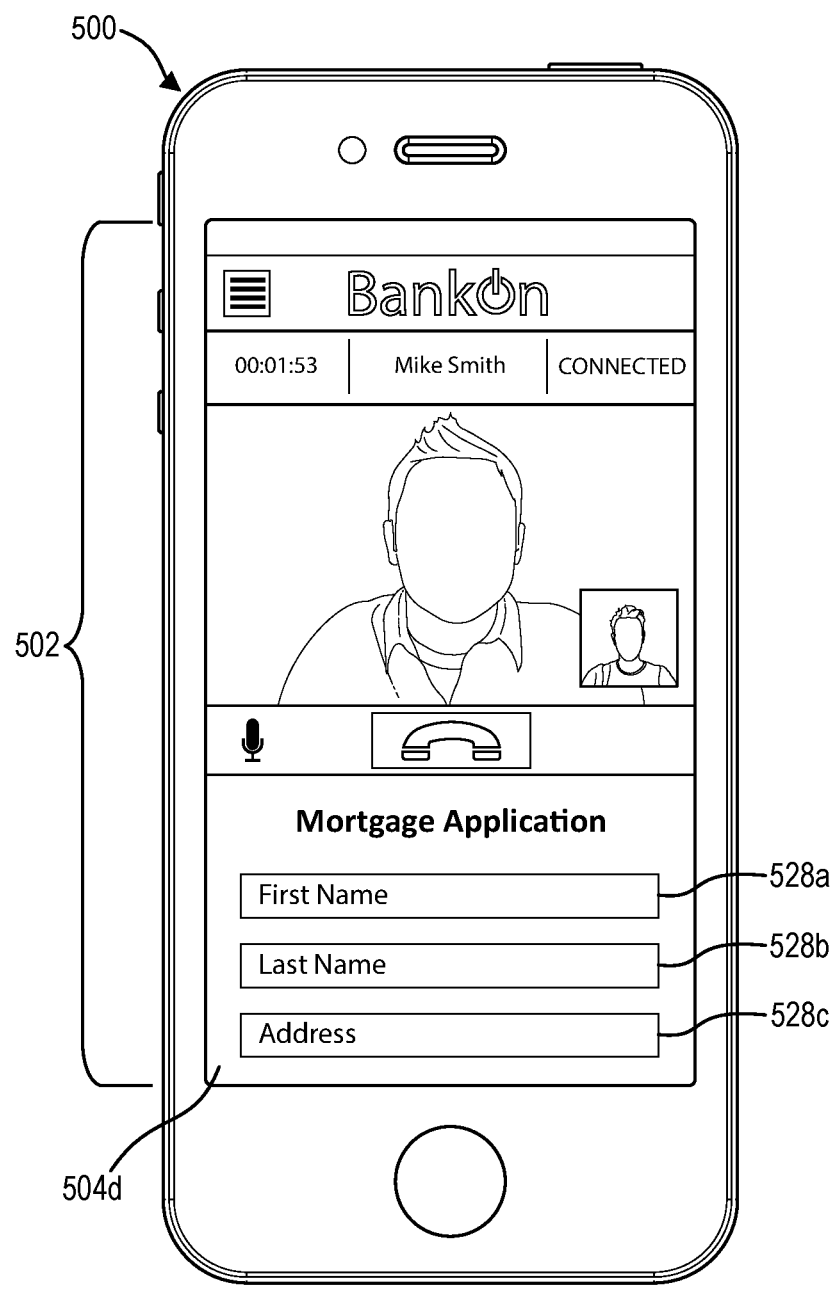

FIG. 5D illustrates another embodiment of the mobile device 500 displaying a dual pane display 502. In particular, the mobile device 500 provides a fourth display element 504*d* in the second pane 510 that is a fillable form that enables a user of the mobile device to enter input into the form. In particular, the fourth display element 504*d* includes fillable fields 528*a*-528*c*. By way of illustration, fillable fields 528*a*-528*c* instruct a user to input a first name, a last name, and an address, respectively. In other embodiments, the fourth display element 504*d* instructs a user to input other types of information. For example, the fourth display element 504*d* includes one or more fillable fields associated with a user's birthday, state of residence, or driver's license number.

Upon detecting a user selection of one of fillable fields 528*a*-528*c*, the mobile device 500 presents the mobile device user with an alphanumeric keypad for entering information into the corresponding line. Additionally, or alternatively, the mobile device 500 presents the user with a list of optional inputs where there are a limited number of inputs available or acceptable (e.g., a drop-down list). For example, if a fillable field is associated with a state of residence, upon selecting that fillable field to provide user input, the fourth display element 504*d* displays a list of states as potential input options. Additionally, or alternatively, the mobile device 500 may accept information through voice command for a fillable field, where the user vocally inputs the requested information.

Figure 5E:
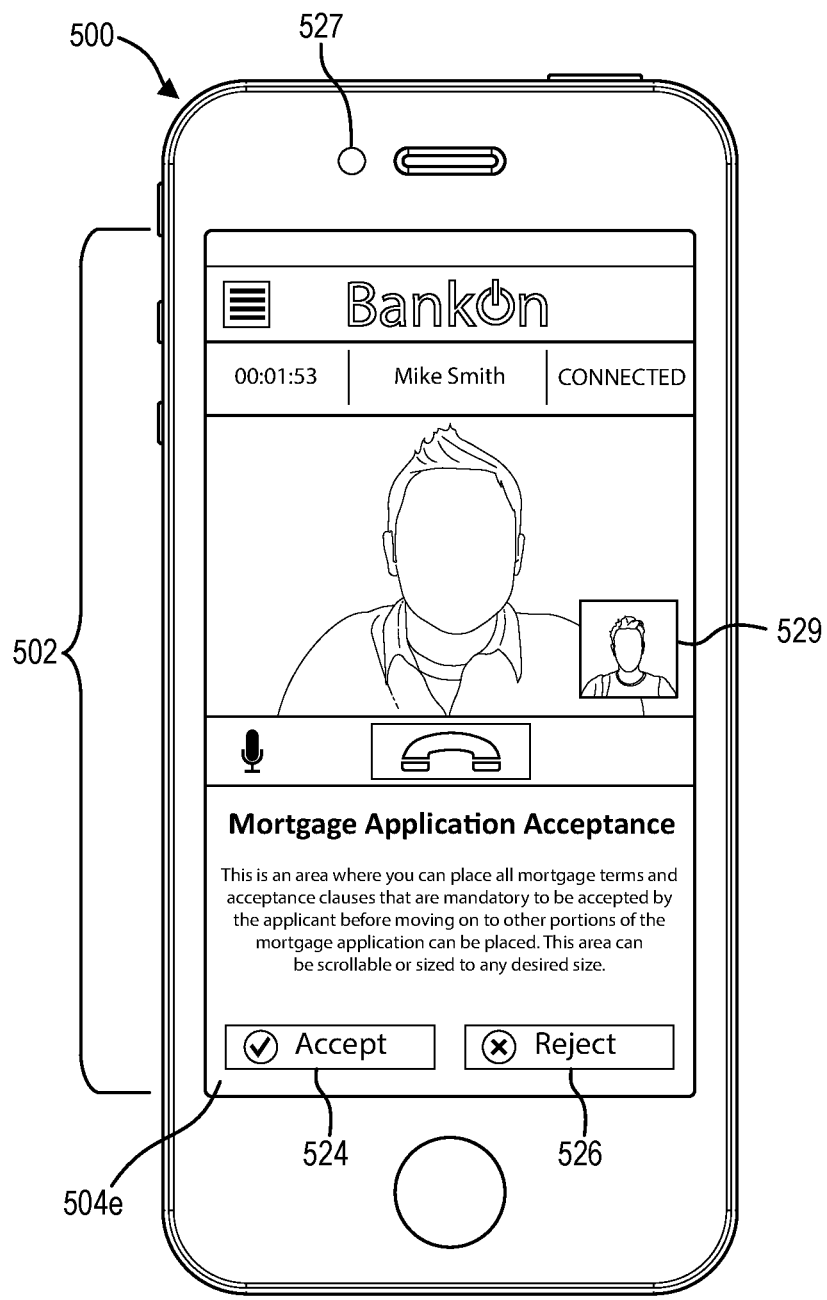

FIG. 5E illustrates yet another embodiment of the mobile device 500 displaying a dual pane display 502. In particular, the mobile device 500 provides a fifth display element 504*e* in the second pane 510 that includes terms and conditions of a document. In addition, the fifth display element 504*e* includes an authentication element that enables the user to accept (e.g., the accept graphical element 524) or reject (e.g., the reject graphical element 526) the terms and conditions.

As described above, in one or more embodiments, the mobile device 500 provides one or more captured images of the user in connection with the user selecting the accept graphical element 524 (i.e., confirming the authentication element). For example, upon the mobile device 500 detecting that the user selects the accept graphical element 524, the mobile device 500 captures an image of the user via the camera 527 to provide to the support terminal and/or provides an indication to the support terminal to capture an image of the user via the video chat, as described above.

In some embodiments, the text or content in the second pane 510 (i.e., the document of terms and conditions shown in the fifth display element 504*e*) is divided into sections. For each section, the user must select the accept graphical element 524 to view the next section. In some embodiments, the mobile device 500 captures and provides an image of the user each time the user selects the accept graphical element 524. Additionally, the mobile device 500 can provide an image of the user upon the user selecting the accept graphical element 524 at the end of all the sections to confirm acceptance of all the terms and conditions provided in a document.

Further, in some embodiments, the mobile device 500 expands the second pane 510 to enable a user to view more text included in a document. For example, the mobile device 500 automatically expands the size of the second pane 510 (e.g., to the full screen) while the user reads the terms and conditions. In an alternative example, the mobile device 500 enables the user to resize the second pane 510 to a user-desired size. Upon detecting the user accepting the document, the mobile device 500 resizes the second pane 510 to the original size.

In addition to the authentication element shown in FIG. 5E, the mobile device 500 can capture and provide an image of the user in connection with detecting and providing confirmation of any graphical element. For example, the support terminal provides a graphical element to the mobile device 500 to display in the second pane 510 or another pane. Further, the support terminal instructs the mobile device 500 to report when the user interacts with the graphical element along with reporting a captured image of the user as the user interacts with the graphical element. Thus, upon detecting user interaction with the graphical element, the mobile device 500 reports the user interaction (or the result of the user interaction) and a captured image of the user.

Figure 5F:
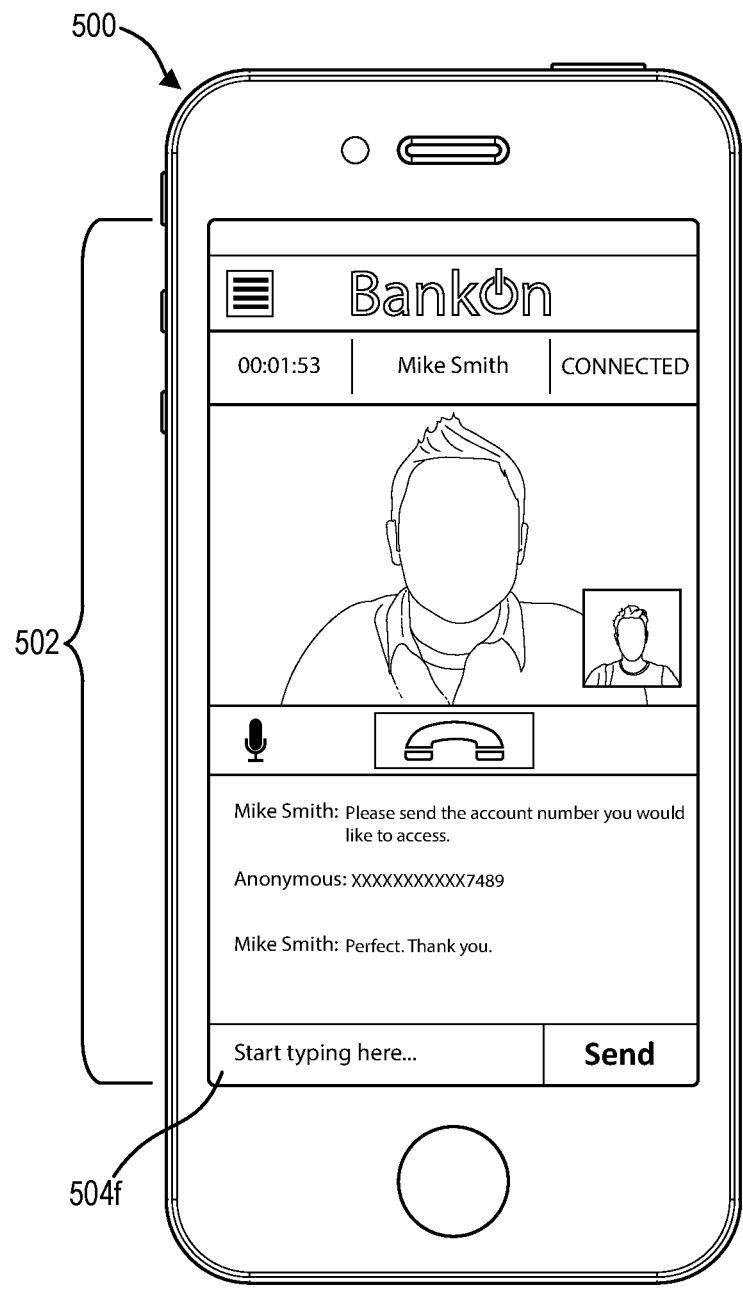

FIG. 5F illustrates another embodiment of the mobile device 500 displaying a dual pane display 502. In particular, the mobile device 500 provides a sixth display element 504*f* in the second pane 510 that is a text-based messaging interface. As shown, the sixth display element 504*f* enables a user to input and provide a text-based message to the support terminal (e.g., a support representative or a bot). Additionally, the sixth display element 504*f* may receive and display text-based messages from the support terminal.

In one or more embodiments, the mobile device 500 provides a combination of the display elements 504*a*-504*f* described above. Additionally, or alternatively, the mobile device 500 displays different display elements than described above. For example, the support terminal generates and sends computer-readable code, such as a bar code or a Quick Response (QR) code. The computer-readable code, when scanned, can cause another device to perform an action. For instance, the computer-readable code, when scanned by an ATM, can cause the ATM to dispense a predetermined amount of funds.

In some embodiments, rather than directly providing content for a display element, the support terminal provides a link to a location where the mobile device 500 can access and display the content. For example, the support terminal sends a link to a local or remote location where a document, an authentication element, or other content can be accessed. In response, the mobile device 500 uses the link to access and display the content within the second pane 510.

Further, as discussed above, a display element may include more information or modifiable elements than can be presented on a single pane at one time. Therefore, in one or more embodiments, the display elements 504a-504f may be scrollable, wherein a user may scroll in a direction where information or modifiable elements in addition to those currently presented may be viewed and interacted with to access and/or enter information. Alternatively, the display elements 504a-504f may provide information or interactive elements on multiple pages and present a user with options to view a subsequent or previous page.

FIG. 6 illustrates a sequence 600 of capturing an image of a user in connection with the user confirming an authentication element in accordance with one or more embodiments. As shown, the sequence 600 can be implemented between the support terminal 102 and the mobile device 104 described above. For example, in some embodiments, the mobile device 104 in the sequence 600 displays two or more panels to a user where the first panel includes a video chat and the second panel includes a display element having an authentication element, as described above.

As shown in FIG. 6, the mobile device 104 and the support terminal 102 establish 602 a chat connection. In particular, the mobile device 104 sends a request for a video chat to the support terminal 102, upon which, the support terminal 102 provides a connection via which a video chat session is established. In alternative embodiments, the mobile device 104 and the support terminal 102 establish an audio or text chat session.

In addition, the support terminal 102 provides 604 an authentication element via server connection (e.g., a Web-Socket connection) to the mobile device 104. For example, the support terminal 102 provides a trigger that causes the mobile device 104 to add a second pane to display the authentication element, as described above. For instance, the authentication element is a user input field (e.g., signature line 522) and/or a selectable graphical element (e.g., accept graphical element 524).

FIG. 6 also illustrates the mobile device 104 detecting 606 user input confirming the authentication element. In particular, the mobile device 104 detects a user signing and submitting their signature or accepting a document (e.g., terms and conditions). In addition, upon detecting the confirmation, the mobile device 104 captures 608 an image of the user as illustrated. For example, the mobile device 104 captures the user's image as described above. Alternatively, the mobile device 104 sends an indication to the support terminal 102 to captures the user's image.

As shown, the mobile device 104 then provides 610 the to the support terminal 102. In some embodiments, the mobile device 104 sends the in the same communication and/or via the same connection. In alternative embodiments, the mobile device 104 sends the confirmation and the captured image via different connections to the support terminal 102. In some embodiments, the mobile device 104 also provides a location in connection with sending the confirmation and captured image. For example, the location can include GPS coordinates, an IP address and or a user-provided, which the support terminal 102 logs upon receipt.

Upon receiving the confirmation of the authentication element and the captured image of the user, the support terminal 102 logs 612 the confirmation and the captured image. In particular, the support terminal 102 saves the confirmation and the captured in a database entry associated with the user. An example of such a database entry is provided below in FIG. 7.

Figure 7:
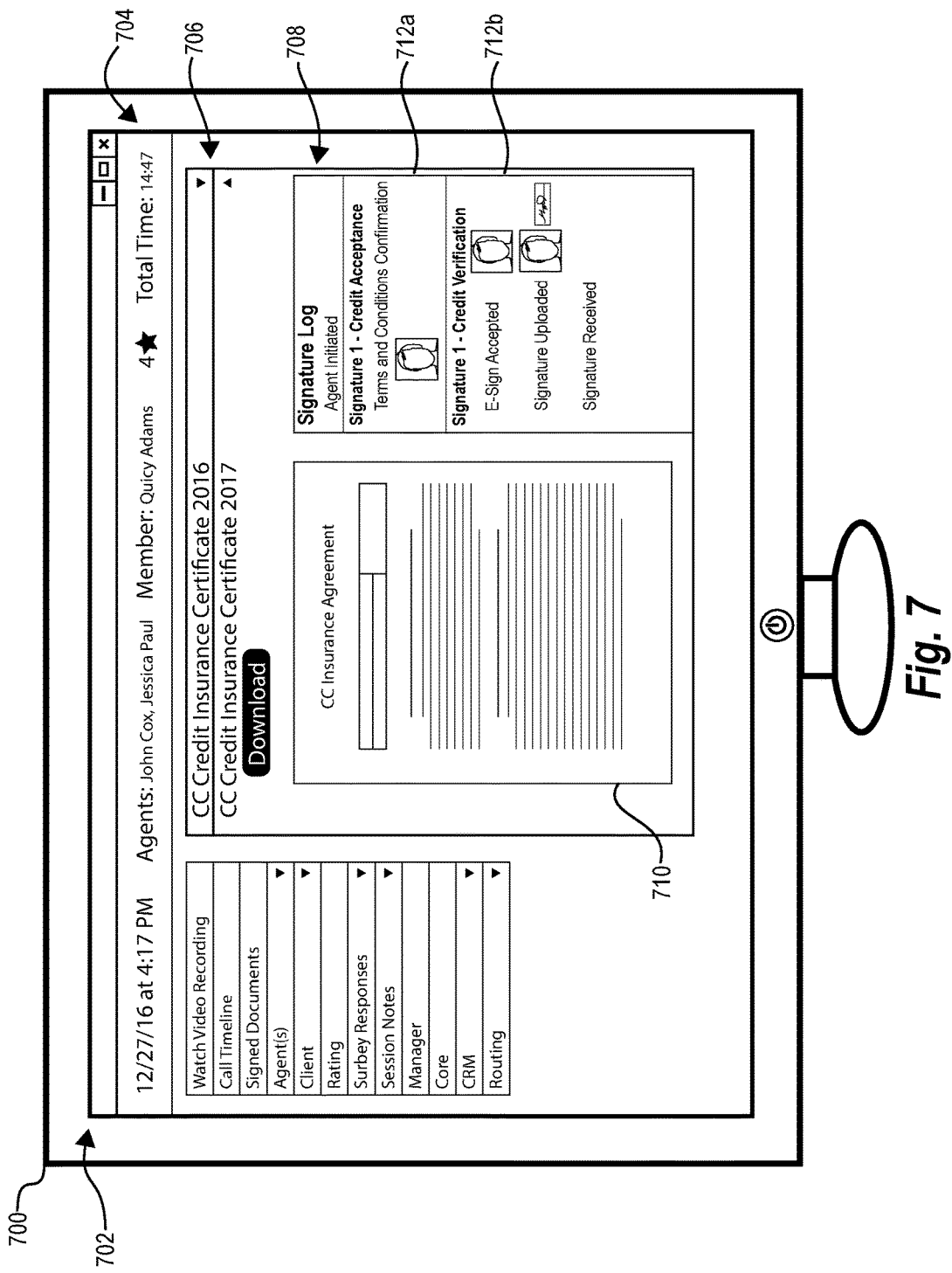
FIG. 7 illustrates a graphical user interface of a user profile in accordance with one or more embodiments.

FIG. 7 illustrates a graphical user interface 702 on a computing device 700 of a user profile 704 in accordance with one or more embodiments. The computing device 700 can include a mobile or non-mobile device as described below with respect to FIG. 12, which is hosted by a support terminal (e.g., the support terminal 102). For example, a support representative or administrator uses the computing device 700 to view the user profile 704 of the user (i.e., a user of a mobile device).

As shown, the user profile 704 includes a number of graphics, elements, and components that provide information about the user. For example, the user profile 704 includes the user's name (e.g., member), agents, time logged with a support representative, along with other information specific to the user. Further, the user profile 704 includes menu options to access various sub-profile pages of the user. Notably, the user profile 704 includes user record 706 of the user's confirmations (e.g., acceptances) of various documents, contracts, terms, fees, conditions, and/or services.

As shown, the user record 706 includes an open record and a minimized record. The user record 706 can include more or fewer records associated with a user. As illustrated, the open record shows a copy of a document 710 and an acceptance log 708 indicating when and how the user confirmed acceptance of the document 710. In particular, the acceptance log 708 includes a first confirmation entry 712a showing that the user confirmed acceptance of terms and conditions. In addition, the acceptance log 708 includes a second confirmation entry 712b showing that the user provided a signature confirming acceptance of the document 710. In some embodiments, the confirmation entries also include the location (e.g., GPS or IP Addresses) of the mobile device at the time of the confirmation and/or captured images.

As illustrated in FIG. 7, each of the confirmation entries includes information about what type of confirmation was received at the support terminal, a timestamp of the user's confirmation, and an image of the user at the time of confirmation. In particular, the second confirmation entry 712b shows multiple stages of user confirmation of the document 710. Further, the second confirmation entry 712b shows the saved image of the user's signature in connection with the captured image of the user.

As mentioned above, a support terminal can provide the graphical user interface 702 of the user profile 704. For example, a support terminal logs the confirmations entries in a database, such as a local or remote database repository, in connection with a captured image and information about the user's acceptance. Then, when a support representative accesses the user profile 704, the support terminal recalls the stored information and provides the user record 706 within the graphical user interface 702.

By storing visual confirmation in connection with other confirmations in records associated with users, the support terminal can facilitate accurate and reliable retention of the user's acceptance of a document. For example, in one or more embodiments, each stored user record includes information about the confirmation process of a document by the user such that the stored record satisfies national or international electronic signature laws, acts, and standards. In this manner, the support terminal ensures that records of user agreements are reliable, binding, and enforceable.

In one or more embodiments, the support terminal enables a support representative to run queries, reports, and/or searches where the results include one or more confirmation entries of a user. For example, the graphical user interface 702 displays a session report that indicates each of the documents that a user accepted during the session, when, and how the user confirmed the acceptances (e.g., whether the user provided a signature). Further, the session report can include one or more captured images of the user as they provided user input to accept each document as additional visual confirmation.

Figure 8:
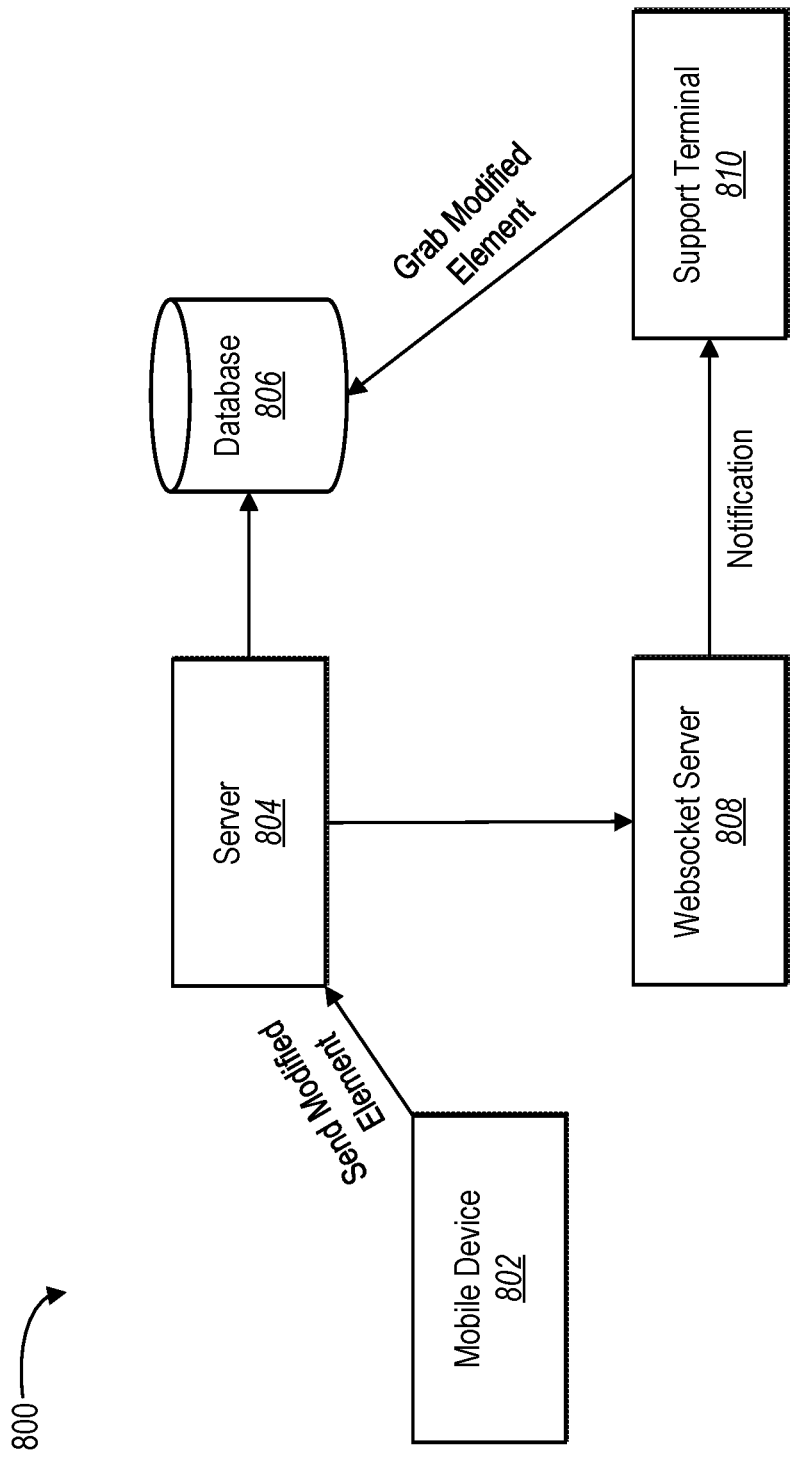
FIG. 8 illustrates an example implementation of a communications system used to send a modified display element in accordance with one or more embodiments.

FIG. 8 illustrates an example implementation of a communications system 800 (or simply "system 800") used to send a modified display element or another reply to a display element. As illustrated in FIG. 8 the system 800 comprises a mobile device 802, a server 804, a database repository 806, a WebSocket server 808, and a support terminal 810. While shown as separate components, in some embodiments, the server 804, the database repository 806, the WebSocket server 808, and the support terminal 810a are included in a support system.

The system 800 establishes a connection between the mobile device 802 and the database repository 806 through the server 804. The connection is a third connection in addition to the first and second connections discussed with respect to the system 100 of FIG. 1. The server 804 enables the mobile device 802 to securely transmit a modified display element to the database repository 806. As illustrated in FIG. 8, the server 804 is a single server. Alternatively, the third connection may be made through a series of servers.

After receiving a modified display element, the server 804 forwards the modified display element to the database repository 806 and sends a notification to the support terminal 810 through the Web Socket server 808. In one or more alternative embodiments, the notification may be sent to the support terminal directly from the mobile device 802. The notification indicates that the database repository 806 has received the modified display element and provides a location of the element within the database repository 806 so the support terminal 810 may grab the modified element. Additionally, or alternatively, the notification may include a link to the location of the modified display element, enabling the support terminal 810 to quickly acquire the modified element.

The database repository 806 may comprise any service that allows for the deposit and retrieval of electronic files. For example, the database repository 806 may be an electronic drop box, email service, or another cloud-based technology that allows electronic file sharing.

As shown by FIG. 8, the system can utilize cloud hosting (i.e., the database can comprise one or more cloud based servers). This type of cloud hosting allows for flexibility and scalability. New instances of servers can be created quickly and efficiently to ensure the system scales the use of the application as adoption rates increase. Thus, embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
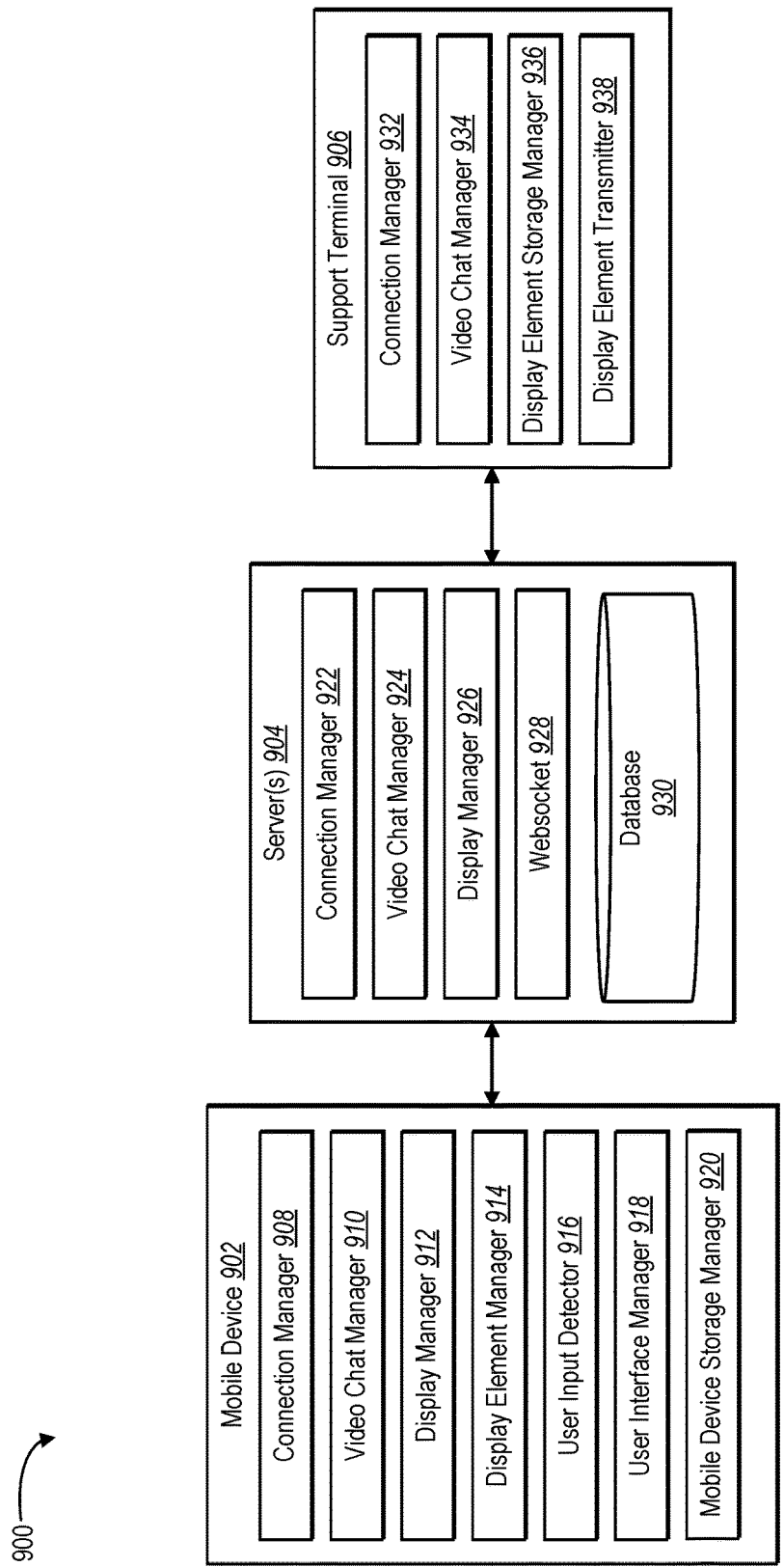
FIG. 9 illustrates a schematic diagram of a communications system in accordance with one or more embodiments.

Turning now to FIG. 9, additional detail will be provided regarding components and capabilities of one embodiment of the present invention comprising the communications system 100 as well as the communications system 800. In particular, FIG. 9 illustrates an embodiment of an exemplary system 900. As shown, the system 900 may include, but is not limited to, a mobile device 902, a server system 904, and a support terminal 906. Moreover, as shown, the mobile device 902 includes, but is not limited to, a connection manager 908, a video chat manager 910, a display manager 912, a display element manager 914, a user input detector 916, a user interface manager 918, and a mobile device storage manager 920. Additionally, as shown in FIG. 9, the server system 904 includes, but is not limited to, a connection manager 922, a video chat manager 924, a display manager 926, a WebSocket 928, and a database 930. Furthermore, as shown in FIG. 9, the support terminal 906 includes, but is not limited to, a connection manager 932, a video chat manager 934, a display element storage manager 936, and a display element transmitter 938.

As just mentioned, and as illustrated in FIG. 9, the mobile device 902 includes the connection manager 908. The connection manager 908 searches for, detects, identifies, accepts, establishes, monitors, and maintains various types of connections. In particular, the connection manager 908 establishes and maintains one or more connections between the mobile device 902 and another device, such as the support terminal 906. For example, when establishing a video chat between the mobile device 902 and the support terminal 906, the connection manager 908 will establish and maintain a peer-to-peer connection through the duration of a video chat session.

As mentioned, and as illustrated in FIG. 9, the mobile device 902 also includes the video chat manager 910. The video chat manager 910 initiates, provides for display, and maintains a video chat between the mobile device 902 and another device, such as the support terminal 906. In particular, the video chat manager 910 operates in conjunction with the connection manager 908 to establish and maintain a video chat between the mobile device 902 and another device, such as a support terminal 906. Additionally, the video chat manager 910 operates in conjunction with any number of user input/output devices, including, but not limited to cameras, microphones, display screens, touchscreens, and keypads.

As mentioned, and as illustrated in FIG. 9, the mobile device 902 also includes the display manager 912. The display manager 912 maintains and changes a display presented on the mobile device 902. In particular, the display manager 912 works in conjunction with the user input detector 916 to change a display of the mobile device in response to detecting a user interaction. Additionally, the display manager 912 works in conjunction with the user interface manager 918 to display a graphical user interface.

The display manager 912 also changes the display of the mobile device 902 in response to receiving triggering code through a connection to another device. For example, the display manager 912 may receive triggering code over a connection. In response to receiving the triggering code, the display manager 912 can divide the display of the mobile device 902 into multiple panes, enabling the mobile device 902 to display multiple display items within the multiple panes. As referred to herein, a "display item" refers to any visual component (e.g. character, image, video, or user interface) For example, the mobile device 902 may be able to display separate mobile applications in the multiple panes or the mobile device may display a video chat in one pane and a display element in another.

Additionally, the display manager 912 may modify the size of the multiple panes according to the needs of the items displayed in those panes. In particular, the display manager 912 may increase the size of a pane if the display item within the pane requires more display space.

As mentioned, and as illustrated in FIG. 9, the mobile device 902 also includes the display element manager 914. The display element manager 914 receives, sends, and provides for display elements. In particular, the display element manager operates in conjunction with the display manager 912 to display a display element on the mobile device 902. In one or more embodiments, the display manager 912 displays one or more authentication element within or in association with a display element.

Additionally, the display element manager 914 modifies and maintains display elements. In particular, the display element manager operates in conjunction with the user input detector 916 to detect a user input. In response to detecting a user input, the display element manager 914 modifies the display element in accordance with the particular user interaction. For example, the display manager 912 provides an authentication element such as a signature line or accept graphical element, and the user input detector 916 detects the user providing user input and/or interacting with the authentication element.

As just mentioned, and as illustrated in FIG. 9, the mobile device 902 also includes the user input detector 916. The user input detector 916 detects, identifies, monitors, receives, processes, captures, and/or records various types of user input. For example, the user input detector 916 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 916 operates in conjunction with any number of user input devices (in isolation or in combination), mouse devices, keyboards, track pads, or stylus devices. The user input detector 916 detects and identifies various types of user interactions with user input devices, such as select events, drag events, scroll events, and so forth. For example, the user input detector 916 detects one or more touch gestures (e.g., swipe gestures, tap gestures, pinch gestures, or reverse pinch gestures) from a user that forms a user interaction.

The user input detector 916 communicates with, and thus detects user input with respect to, a variety of programs, applications, plug-ins, operating systems, user interfaces, or other implementations in software or hardware.

As mentioned, and as illustrated in FIG. 9, the mobile device 902 also includes the user interface manager 918. The user interface manager 918 provides, manages, and/or controls a graphical user interface (or simply "user interface") for use with the system 900. In particular, the user interface manager 918 can facilitate presentation of information by way of an external component of the mobile device 902. For example, the user interface manager 918 can display a user interface by way of a display screen associated with the mobile device 902. The user interface may be composed of a plurality of graphical components, objects, and/or elements that allow a user to perform a function. The user interface manager 918 presents, via the mobile device 902, a variety of types of information, including text, images, video, audio, characters, or other information. Moreover, the user interface manager 918 provides a variety of user interfaces specific to any variety of functions, programs, applications, plug-ins, devices, operating systems, and/or components of the mobile device 902.

The user interface manager 918 can provide a user interface with regard to a variety of operations or applications. For example, the user interface manager 918 provides a user interface that facilitates selecting, identifying, searching, or downloading digital files. Similarly, the user interface manager 918 can generate a user interface that facilitates managing, editing, modifying, downloading, uploading, or sending digital images. Additional details with respect to various example user interface elements are described throughout with regard to various embodiments containing user interfaces.

In additional embodiments, the user interface manager 918 captures an image of the user based on receiving an indication from the user input detector 916 that the user is interacting with an authentication element. For example, when a user provides their signature to an authentication element, the user input detector 916 detects the user input with the authentication element and notifies the user interface manager 918. The user interface manager 918 then uses the camera of the mobile device 902 to capture an image of the user as the user is performing the interaction.

In addition, as illustrated in FIG. 9, the mobile device 902 also includes the mobile device storage manager 920. The mobile device storage manager 920 maintains data for the system 900. The mobile device storage manager 920 can maintain data of any type, size, or kind, as necessary to perform the functions of the system 900.

Furthermore, as illustrated in FIG. 9, the server system 904 includes the connection manager 922. The connection manager 922 searches for, detects, identifies, accepts, establishes, monitors, and maintains various types of connections. In particular, the connection manager 922 establishes and maintains one or more connections between devices. For example, the connection manager 922 may establish a connection between the mobile device 902 and the support terminal 906.

As mentioned, and as illustrated in FIG. 9, the server system 904 also includes the video chat manager 924. The video chat manager 924 establishes, receives, transmits, and maintains a video chat between multiple devices. For example, the video chat manager 924 may establish and maintain a video chat between the mobile device 902 and another device, such as the support terminal 906. In particular, the video chat manager 924 operates in conjunction with the connection manager 922 to establish and maintain a video chat across a connection maintained by server system 904.

As mentioned, and as illustrated in FIG. 9, the server system 904 also includes the display manager 926. The display manager 926 receives and transmits items for display on devices. In particular, the display manager 926 can transmit items sent from one device to another device. For example, the display manager 926 can transmit a display element sent from the support terminal 906 to be displayed on the mobile device 902.

As mentioned, and as illustrated in FIG. 9, the server system 904 also includes the WebSocket 928. The WebSocket 928 is a bi-directional communication module that enables a device acting as a server to push data to a client device, rather than waiting for the client device to send a request for data, which the server then fills. In particular, the WebSocket 928 operates in conjunction with the display manager 926 to enable a device acting as a server to push items for display to a device acting as a client. For example, the WebSocket 928 and the display manager 926 work in conjunction to enable the support terminal 906 to push a display element for display to the mobile device 902.

As mentioned, and as illustrated in FIG. 9, the server system 904 also includes the database 930. The database 930 operates as a database repository to store data for retrieval. The database 930 can operate as an electronic cloud storage system (e.g. an electronic drop box). In particular, the database 930 stores data for retrieval from a device. For example, the database 930 can store a modified display element received from the mobile device 902 until it is overwritten or retrieved by the support terminal 906.

Furthermore, as illustrated in FIG. 9, the support terminal 906 includes the connection manager 932. The connection manager 932 searches for, detects, identifies, accepts, establishes, monitors, and maintains various types of connections. In particular, the connection manager 932 establishes and maintains one or more connections between the support terminal 906 and another device, such as the mobile device 902. For example, when establishing a video chat between the mobile device 902 and the support terminal 906, the connection manager 932 will establish and maintain a peer-to-peer connection through the duration of the video chat session.

As mentioned, and as illustrated in FIG. 9, the support terminal 906 also includes the video chat manager 934. The video chat manager 934 initiates, provides for display, and maintains a video chat between the support terminal and another device, such as the mobile device 902. In particular, the video chat manager 934 operates in conjunction with the connection manager 932 to establish and maintain a video chat between the support terminal 906 and another device, such as a mobile device 902.

Additionally, the video chat manager 934 operates in conjunction with any number of user input/output devices, including, but not limited to cameras, microphones, display screens, touchscreens, and keypads.

As mentioned, and as illustrated in FIG. 9, the support terminal 906 also includes the display element storage manager 936. The display element storage manager 936 stores display elements (e.g., an authentication element) that may be selected and transmitted to another device, such as the mobile device 902. In some embodiments, the display element storage manager 936 stores display elements in a set, a pipeline or flows, such that one or more display elements (e.g., authentication elements) can be selected and provide to the mobile device 902, as described above. In addition, the display element storage manager 936 operates in conjunction with the display element transmitter 938 and the connection manager 932 to transmit a display element across a connection.

In some embodiments, the display element storage manager 936 stores one or more triggers in connection with a display element. For example, when providing an authentication element to the mobile device 902, the authentication element includes instructions to capture an image when the user is interacting with the authentication element. Additionally, or alternatively, the authentication element includes instructions to indicate to the support terminal when the user is interacting with the authentication element such that the support terminal 906 can capture the image of the user (via the video chat manager 934).

As mentioned, and as illustrated in FIG. 9, the support terminal 906 also includes the display element transmitter 938. The display element transmitter 938 operates to transmit a display element across a connection to another device.

Figure 10:
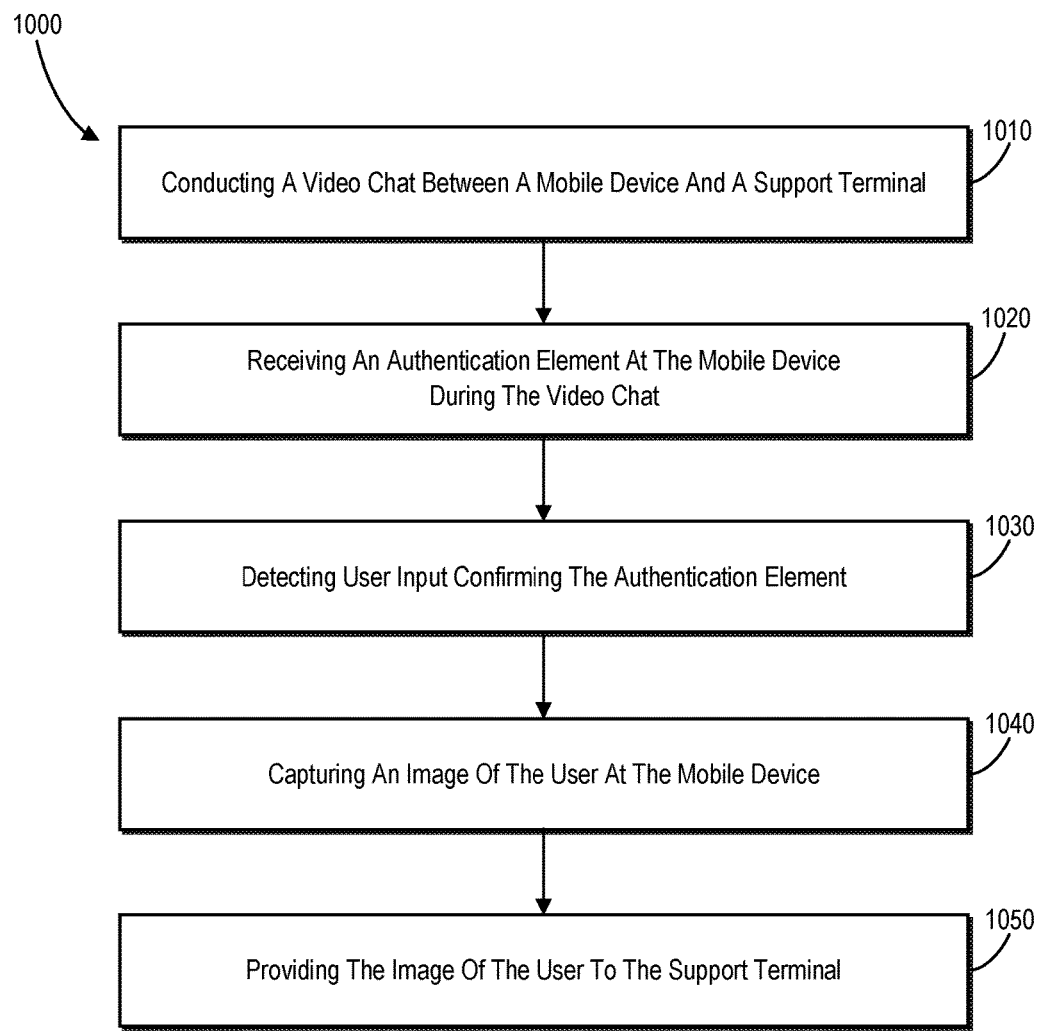
FIG. 10 illustrates a flowchart of a series of acts in a method of providing visual confirmation of user input in accordance with one or more embodiments.

FIG. 10 illustrates a flowchart of a series of acts in a method 1000 of providing visual confirmation of user input in accordance with one or more embodiments of the present invention. In one or more embodiments, a mobile device implements the method 1000. In some embodiments, a combination of devices, such as a mobile device, servers, and/or a support terminal implement the method 1000.

As illustrated in FIG. 10, the method 1000 can include an act 1010 of conducting a video chat between a mobile device 104 and a support terminal 102. In particular, the act 1010 can involve conducting a video chat between a mobile device and a support terminal via a first connection. In some embodiments, the first connection is a peer-to-peer connection or a connection via a series of servers, as described above.

As shown, the method 1000 also includes an act 1020 of receiving an authentication element at the mobile device 104 during the video chat. In particular, the act 1020 can involve receiving, from the support terminal 102, an authentication element at the mobile device 104 via a second connection during the video chat. In some embodiments, the authentication element is a display element or at least included in a display element. In some instances, the authentication element includes a signature field or a graphical element to accept or reject terms provided by the support terminal. In one or more embodiments, the second connection is a server WebSocket connection.

The method 1000 also includes an act 1030 of detecting user input confirming the authentication element. In one or more embodiments, the act 1030 can include detecting that a user is providing a signature for a document and/or selecting a graphical element that accepts a document. In some embodiments, detecting user input causes the mobile device to display a subsequent display element over the authentication element where the subsequent display element is the user input (e.g., user signature). In various embodiments, the subsequent display element is provided to a database repository via a third connection.

As shown, the method 1000 also includes an act 1040 of capturing an image of the user at the mobile device 104. The act 1040 can include rec capturing, upon detecting the user input confirming the authentication element, an image of the user at the mobile device 104. In some embodiments, detecting the user input confirming the authentication element triggers instructions at the mobile device to capture an image of the user. For example, the act 1040 can include receiving, from the support terminal, a trigger via the second connection during the video chat and executing, in response to receiving the trigger, code stored on the mobile device to activate a peripheral of the mobile device. In other embodiments, detecting the user input confirming the authentication element triggers instructions at the mobile device to send an indication to the support terminal to capture the user's image.

As further shown in FIG. 10, the method 1000 also includes an act 1050 of providing the image of the user to the support terminal 102. In particular, the act 1050 can involve providing the image of the user to the support terminal in connection with confirmation of the authentication element. In some embodiments, providing the image of the user to the support terminal in connection with confirmation of the authentication element and modifying the authentication element each occurs independently of the video chat.

The method 1000 can include one or more additional acts. For example, in one or more embodiments, the method 1000 further includes the acts of receiving, from the support terminal, a display element via the second connection during the video chat; and in response to receiving the display element: dividing a display screen of the mobile device into a first pane and a second pane, providing the video chat in the first pane, and providing the display element in the second pane. In some embodiments, receiving the authentication element at the mobile device comprises receiving a location of the authentication element and retrieving the authentication element from the location via a third connection.

Figure 11:
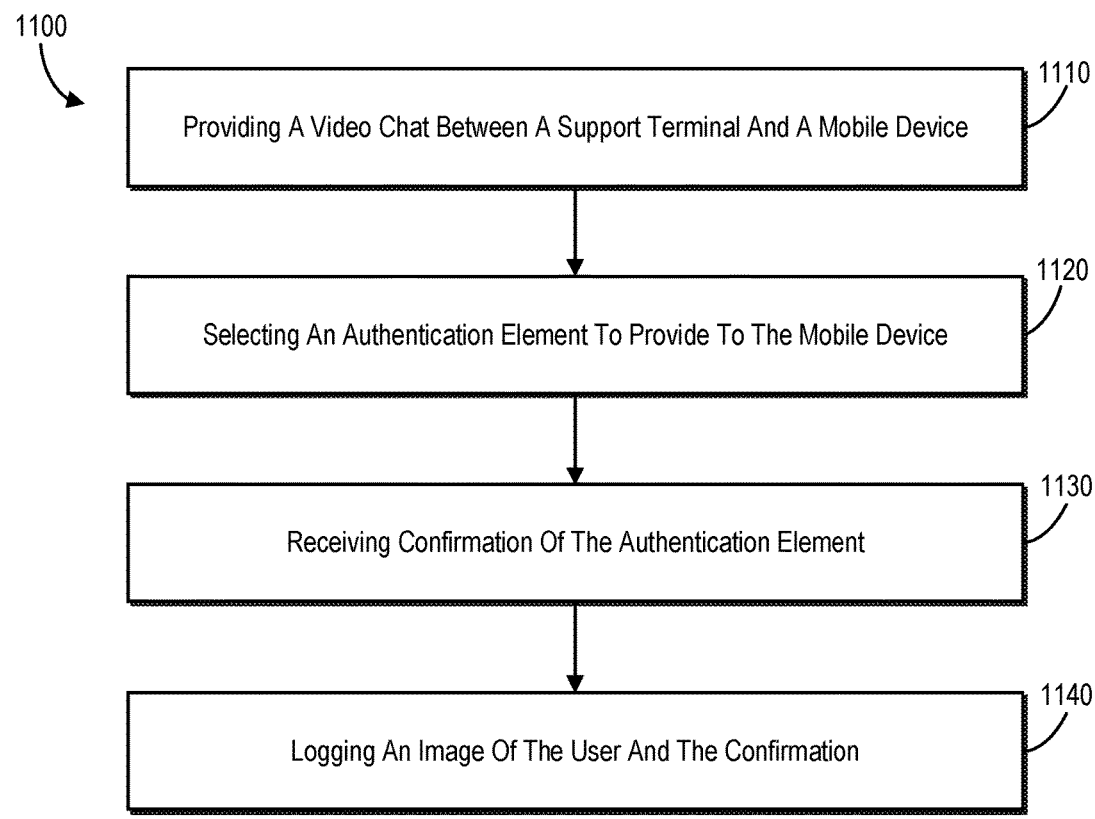
FIG. 11 illustrates a flowchart of series of acts in a method of receiving and storing visual confirmation of user input in accordance with one or more embodiments.

FIG. 11 illustrates a flowchart of series of acts in a method 1100 of receiving and storing visual confirmation of user input in accordance with one or more embodiments. In one or more embodiments, a support terminal implements the method 1100. In some embodiments, a combination of devices, such as a mobile device, servers, and/or a support terminal implement the method 1100.

As illustrated in FIG. 10, the method 1100 can include an act 1110 of providing a video chat between a support terminal 102 and a mobile device 104. In particular, the act 1110 can involve conducting a video chat between a mobile device and a support terminal via a first connection. In some embodiments, the first connection is a peer-to-peer connection or a connection via a series of servers, as described above.

As shown in FIG. 11, the method 1100 also includes an act 1120 of selecting an authentication element to provide to the mobile device. In particular, the act 1120 can involve selecting an authentication element to provide to the mobile device 104 via a second server connection. In one or more embodiments, the act 1120 includes selecting an authentication element from a set of display elements stored on the support terminal. In some embodiments, the act 1120 includes selecting an authentication element based on a pipeline flow and/or input from a support representative associated with the support terminal.

In addition, the act 1120 can include providing the authentication element to the mobile device via the second server connection, where providing the authentication element comprises pushing a trigger to the mobile device that initiates an execution of code stored on the mobile device to activate a capability of the mobile device. Further, in some embodiments, the act 1120 includes executing the code to divide a display screen of the mobile device into a first pane and a second pane, provide the video chat in the first pane, provide the authentication element in the second pane, and/or capture the user's image upon detecting user input with the authentication element.

In addition, the method 1100 also includes an act 1130 of receiving confirmation of the authentication element. In particular, the act 1130 can include receiving, from the mobile device 104, confirmation of the authentication element by a user associated with the mobile device 104. In addition, the act 1130 can include receiving an indication via the second connection to capture an image of the user via the video chat via the first video chat connection. In some embodiments, confirmation is received via the second connection or a third connection. In one or more embodiments, the second server connection is a WebSocket server connection via the support terminal and the mobile device.

Further, as shown in FIG. 11, the method 1100 also includes an act 1140 of logging an image of the user and the confirmation. In particular, the act 1140 can include logging, upon receiving confirmation of the authentication element by the user, an image of the user in association with logging the confirmation of the authentication element by the user. In one or more embodiments, the act 1140 includes capturing the image of the user via the video chat via the first video chat connection and logging the image of the user comprises logging the captured image. In some embodiments, the act 1140 includes receiving an indication via the second connection that the confirmation of the authentication element is stored in a database repository, which enables the support terminal to access the database repository and retrieve the confirmation of the authentication element via a third connection.

Thus, as described above, in one or more embodiments, the system is a unique combination of interactive panes on a mobile or tablet device that can be changed dynamically through a WebSocket layer that is utilized to handle real time communication actions between a second pane and the support representative sending the changes to the second pane. Further, each second pane may change based on the action or function of a representative user interacting with a backend support center. Additionally, a first pane is continuously streaming audio and video to the mobile device during the interactions with the second pane.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 12:
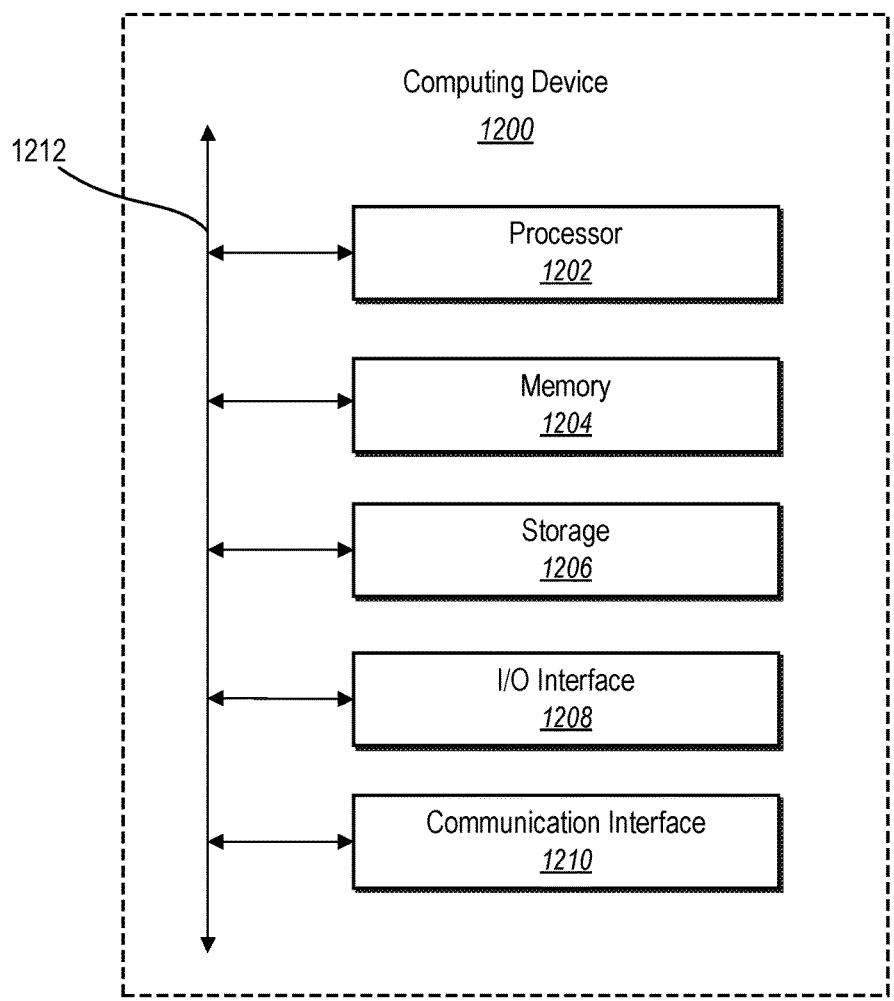
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that the systems 100, 600 can comprise implementations of the computing device 1200. As shown by FIG. 12, the computing device 1200 can comprise a processor 1202, memory 1204, a storage 1206, an I/O interface 1208, and a communication interface 1210. While an exemplary computing device 1200 is shown in FIG. 12, the components illustrated in FIG. 12 are not intended to be limiting. Additional or alternative components may be used in other embodiments. Furthermore, in certain embodiments, a computing device 1200 can include fewer components than those shown in FIG. 12. Components of computing device 1200 shown in FIG. 12 will now be described in additional detail.

In particular embodiments, processor(s) 1202 includes hardware for executing instructions, such as those making up a computer program. As an example and not by way of limitation, to execute instructions, processor(s) 1202 may retrieve (or fetch) the instructions from an internal register, an internal cache, memory 1204, or a storage 1206 and decode and execute them. In particular embodiments, processor(s) 1202 may include one or more internal caches for data, instructions, or addresses. As an example and not by way of limitation, processor(s) 1202 may include one or more instruction caches, one or more data caches, and one or more translation lookaside buffers (TLBs). Instructions in the instruction caches may be copies of instructions in memory 1204 or storage 1206.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage 1206 includes storage for storing data or instructions. As an example and not by way of limitation, storage 1206 can comprise a non-transitory storage medium described above. The storage 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to the computing device 1200. In particular embodiments, storage 1206 is non-volatile, solid-state memory. In particular embodiments, storage 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a stylus or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example and not by way of limitation, communication interface 1210 may include a network interface controller (NIC) or network adapter for communicating with an Ethernet or another wire-based network or a wireless NIC (WNIC) or wireless adapter for communicating with a wireless network, such as a WI-FI.

This disclosure contemplates any suitable network and any suitable communication interface 1210. As an example and not by way of limitation, computing device 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing device 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or another suitable wireless network or a combination thereof. Computing device 1200 may include any suitable communication interface 1210 for any of these networks, where appropriate.

The computing device 1200 can further include a bus 1212. The bus 1212 can comprise hardware, software, or both that connects components of computing device 1200 to each other. As an example and not by way of limitation, bus 1212 may include an Accelerated Graphics Port (AGP) or another graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    conducting a video chat between a mobile device and a support terminal via a first connection;
    receiving, from the support terminal, a display element comprising an authentication element at the mobile device via a second connection during the video chat;
    dividing, in response to receiving the display element, a display screen of the mobile device into a first pane that comprises the video chat and a second pane that comprises the authentication element;
    detecting user input at the mobile device confirming the authentication element within the second pane during the video chat being provided in the first pane;
    capturing, in response to detecting the user input confirming the authentication element during the video chat, an image of a user at the mobile device; and
    providing the image of the user confirming the authentication element to the support terminal in connection with the confirmation of the authentication element.

2. The method of claim 1, wherein capturing the image of the user at the mobile device comprises recording the user from a video chat frame of the video chat in response to detecting the user input confirming the authentication element.

3. The method of claim 1, wherein detecting the user input comprises:
    detecting input entered into a fillable field provided in the second pane;
    or
    detecting selection of a user interface element that accepts or rejects terms in the second pane provided by the support terminal.

4. The method of claim 1, wherein detecting the user input comprises detecting a signing of a document provided in the second pane while the video chat is being conducted in the first pane.

5. The method of claim 1, further comprising:
    receiving a subsequent display element in the second pane as an overlay over the authentication element, wherein the subsequent display element is based on user input at the mobile device; and
    providing the subsequent display element to a database repository via a third connection.

6. The method of claim 1, further comprising:
    receiving, from the support terminal, a trigger via the second connection during the video chat; and
    executing, in response to receiving the trigger, code stored on the mobile device to activate a camera of the mobile device to capture the image of the user.

7. The method of claim 1, wherein the authentication element comprises:
    a signature field; or
    a graphical element to accept or reject terms provided by the support terminal.

8. The method of claim 1, wherein the second connection is a server WebSocket connection.

9. The method of claim 1, wherein providing the image of the user to the support terminal in connection with confirmation of the authentication element and modifying the authentication element each occurs independently of the video chat.

10. The method of claim 1, wherein receiving the authentication element at the mobile device comprises receiving a location of the authentication element and retrieving the authentication element from the location via a third connection.

11. A non-transitory computer readable medium storing instructions that, when executed by at least one processor, cause a computer system to:
conduct a video chat between a mobile device and a support terminal via a first connection;
receive, from the support terminal, a display element comprising an authentication element at the mobile device via a second connection during the video chat;
divide, in response to receiving the display element, a display screen of the mobile device into a first pane that comprises the video chat and a second pane that comprises the authentication element;
detect user input at the mobile device confirming the authentication element within the second pane during the video chat being provided in the first pane;
capture, in response to detecting the user input confirming the authentication element during the video chat, an image of a user at the mobile device; and
provide the image of the user confirming the authentication element to the support terminal in connection with the confirmation of the authentication element.

12. The non-transitory computer readable medium of claim 11, wherein the instructions that, when executed by the at least one processor, cause the computer system to capture the image of the user at the mobile device by recording the user from a video chat frame of the video chat in response to detecting the user input confirming the authentication element.

13. The non-transitory computer readable medium of claim 11, wherein the instructions that, when executed by the at least one processor, cause the computer system to detect the user input by detecting a signing a document provided in the second pane while the video chat is being conducted in the first pane.

14. A method comprising:
providing a video chat between a support terminal and a mobile device via a first video chat connection;
selecting, during the video chat, an authentication element to provide to the mobile device via a second server connection;
providing, to the mobile device, a display element comprising the authentication element via the second server connection during the video chat, wherein the display element causes the mobile device to split a display screen of the mobile device into a first display pane that displays the video chat and a second display pane that displays the authentication element;
receiving, from the mobile device, confirmation of the authentication element by a user associated with the mobile device, wherein the authentication element is confirmed by the user within the second display pane on the mobile device during the video chat; and
logging, upon receiving confirmation of the authentication element by the user during the video chat, an image of the user in association with logging the confirmation of the authentication element by the user.

15. The method of claim 14, further comprising capturing the image of the user via the video chat via the first video chat connection, wherein logging the image of the user comprises logging the captured image.

16. The method of claim 14, further comprising providing the authentication element to the mobile device via the second server connection, wherein providing the authentication element comprises pushing a trigger to the mobile device that initiates an execution of code stored on the mobile device to activate a capability of the mobile device.

17. The method of claim 16, wherein the execution of code stored on the mobile device further cause the mobile device to capture the image of the user upon interaction with the authentication element.

18. The method of claim 14, wherein the second server connection is a WebSocket server connection via the support terminal and the mobile device.

19. The method of claim 14, further comprising receiving an indication via the second server connection that the confirmation of the authentication element is stored in a database repository.

20. The method of claim 19, wherein receiving the confirmation of the authentication element comprises accessing the database repository and retrieving the confirmation of the authentication element via a third connection.

* * * * *